United States Patent
Hou et al.

(10) Patent No.: US 12,470,288 B2
(45) Date of Patent: Nov. 11, 2025

(54) METHOD FOR REDUCING FREQUENCY INTERFERENCE, AND COMMUNICATION SATELLITE SYSTEM

(71) Applicant: CHINA ACADEMY OF SPACE TECHNOLOGY, Beijing (CN)

(72) Inventors: Fenglong Hou, Beijing (CN); Feng Li, Beijing (CN); Xiaoxiong Lin, Beijing (CN); Yu Qi, Beijing (CN); Shengwei Pei, Beijing (CN); Dong Chen, Beijing (CN); Jie Xing, Beijing (CN); Hua Huang, Beijing (CN); Xingang Li, Beijing (CN); Jincheng Tong, Beijing (CN); Hengchao Sun, Beijing (CN); Shaoran Liu, Beijing (CN); Zeyu Bao, Beijing (CN)

(73) Assignee: Chinese Academy of Space Technology, Beijing (CN)

( * ) Notice: Subject to any disclaimer, the term of this patent is extended or adjusted under 35 U.S.C. 154(b) by 338 days.

(21) Appl. No.: 18/547,553

(22) PCT Filed: Sep. 30, 2021

(86) PCT No.: PCT/CN2021/122006
§ 371 (c)(1),
(2) Date: Aug. 23, 2023

(87) PCT Pub. No.: WO2022/179106
PCT Pub. Date: Sep. 1, 2022

(65) Prior Publication Data
US 2024/0137110 A1   Apr. 25, 2024
US 2024/0235661 A9   Jul. 11, 2024

(30) Foreign Application Priority Data
Feb. 26, 2021   (CN) .......................... 202110220776.4

(51) Int. Cl.
*H04B 7/185* (2006.01)

(52) U.S. Cl.
CPC ................ *H04B 7/18519* (2013.01)

(58) Field of Classification Search
CPC ............................................ H04B 7/185–195
See application file for complete search history.

(56) References Cited

U.S. PATENT DOCUMENTS 6,135,389 A * 10/2000 Fowell .................... B64G 1/66
                                                                244/158.4
10,707,952 B2 * 7/2020 Dankberg .............. H01Q 1/288
(Continued)

FOREIGN PATENT DOCUMENTS

CN    108882245 A    11/2018
CN    110958047 A     4/2020
(Continued)

OTHER PUBLICATIONS

International Search Report corresponding to PCT Application No. PCT/CN2021/122006, mailed Dec. 30, 2021 (Chinese and English language document) (5 pages).

(Continued)

*Primary Examiner* — Raymond S Dean
(74) *Attorney, Agent, or Firm* — Maginot, Moore & Beck, LLP

(57) ABSTRACT

A method for reducing frequency interference, and a communication satellite system. The method includes configuring the communication satellite system, determining a first range of areas in which a spatial isolation angle between the LEO satellite and the GEO satellite does not satisfy a minimum spatial isolation angle within service areas of the movable spot beams, enabling the movable spot beams to not enter the areas, and when the movable spot beams of the transmitting and receiving user antennas of multiple adja- (Continued)

cent LEO satellites provide services to a same area, calculating a spatial isolation angles between the movable spot beams of the transmitting and receiving user antennas of any two adjacent LEO satellites, and in response to the spatial isolation angle not satisfying the minimum spatial isolation angle, assigning different sub-frequencies to the movable spot beams that do not satisfy the minimum spatial isolation angle.

20 Claims, 8 Drawing Sheets

(56) References Cited

U.S. PATENT DOCUMENTS

| | | |
|---|---|---|
| 11,075,693 B1* | 7/2021 | Regunathan .......... H04B 7/2041 |
| 2009/0040108 A1* | 2/2009 | Katz ..................... G01S 5/0231 |
| | | 342/357.31 |
| 2018/0062737 A1* | 3/2018 | Wyler ................ H04B 7/18521 |
| 2020/0014460 A1 | 1/2020 | Tong et al. |
| 2020/0259556 A1* | 8/2020 | Chari ................. H04B 7/18508 |
| 2022/0006513 A1* | 1/2022 | Robson .............. H04B 7/18528 |

FOREIGN PATENT DOCUMENTS

| | | |
|---|---|---|
| CN | 112039575 A | 12/2020 |
| CN | 112968729 A | 6/2021 |

OTHER PUBLICATIONS

OA for CN application 202110220776.4.
English translation of OA for CN application 202110220776.4.

* cited by examiner

METHOD FOR REDUCING FREQUENCY INTERFERENCE, AND COMMUNICATION SATELLITE SYSTEM

CROSS-REFERENCE TO RELATED APPLICATION

This application is a U.S. national phase application of International Application No. PCT/CN2021/122006, filed on Sep. 30, 2021, which claims priority to Chinese patent application No. 202110220776.4, filed on Feb. 26, 2021, titled "Method Capable of Reducing Frequency Interference, and Communication Satellite System", the entire contents of which are incorporated by reference in this application.

TECHNICAL FIELD

The disclosure relates to a method for reducing frequency interference and a communication satellite system, and belongs to the field of aerospace engineering communication satellite technology.

BACKGROUND

Communication satellite has become one of key applications of the space technology, which is used to receive radio signals from the surface of the Earth and transmit radio signals. With the development and the explosion of demand of the satellite communication technology, radio spectrum has become a very valuable commodity.

A Geostationary Earth Orbits (GEO) satellite is a typical communications satellite, which orbits the Earth in a plane intersecting with the Earth's equator (i.e., equatorial plane), and is distanced from the Earth about 36,000 km (about six times the radius of the Earth). The orbital period is exactly one sidereal day. The GEO satellite orbits the Earth at exactly the same angular velocity as the angular velocity at which the Earth rotates around its axis, and thus the satellite is relatively stationary with respect to an observer on the ground. The great distance between the GEO satellite and the Earth's surface allows for wide area coverage, requires a higher transmitting signal power and causes a larger communication delay. Also, the capacity of a single satellite is limited and the cost is very high.

In recent years, the emerging commercial space companies represented by SpaceX and OneWeb have accelerated the construction of low-orbit communication satellite systems to provide satellite Internet access services. The International Telecommunication Union (ITU) has proposed a "first come, first served" principle for frequency applications, and systems that are applied later need to coordinate their frequencies with systems that have priority and shall not interfere with systems that need to be protected, especially the GEO satellite. How to reduce frequency interference between a low-orbit communication satellite system and the GEO satellite for the frequency bands of Ku and Ka, which are widely used by the GEO satellite, is the most urgent task of constructing the low-orbit communication satellite system.

LINDSAY Michael, WYLER Gregory Thane, et al. of OneWeb, Inc. proposed the patent titled "Communication-Satellite System That Causes Reduced Interference (WO 2016/083894 A2)", and Feng Li, Fenglong Hou, et al. of China Academy of Space Technology proposed the patent titled "Method For Sharing Radio Spectrum On Basis Of Beam Constant Offset, And Low-Orbit Communication Satellite System (No. 201910630504.4)", these two patents are based on the method of "progressive beam bias, bias inversion near the equator" and the method of "beam constant bias, beam bias inversion in the polar region and near the equator", respectively, to realize the solution of sharing radio spectrum between the low-orbit communication satellite system and the GEO satellite. These two patents generally require a relatively small half-angle of user beam coverage for a single satellite, and the beam can still satisfy a minimum communication elevation angle after beam biasing according to preset rules.

When constructing the low-orbit communication satellite systems in batches, it is particularly important to quickly develop a capability to provide continuous and uninterrupted services to users in any region within worldwide or a certain latitude range, while allowing for the expansion of the communication satellite system as needed. In this case, in order to reduce the number of satellites required to complete a basic mission at the beginning of construction, antennas of a Low Earth Orbit (LEO) satellite use a larger half-angle of beam coverage to expand the service range, and generally are selected according to a minimum acceptable beam communication elevation angle. In this case, the method of using beam bias to reduce frequency interference between the LEO satellite and the GEO satellite is no longer be applicable.

SUMMARY

The disclosure aims to provide a method for reducing frequency interference and a communication satellite system.

The disclosure provides a method for reducing frequency interference between a communication satellite system and a GEO satellite and reducing frequency interference within the communication satellite system. The method includes:
  (1) configuring the communication satellite system containing multiple LEO satellites, each LEO satellite is provided with a transmitting user antenna for providing a downlink business beam service for users and a receiving user antenna for providing an uplink business beam service for the users, in which the transmitting user antenna and the receiving user antenna each includes multiple movable spot beams, each movable spot beam is configured as a sub-beam assigned with a different sub-frequency as needed, and the movable spot beams is configured to realize a sub-satellite user gazing or tracking function of the LEO satellite by dynamically adjusting a service area;
  (2) determining, based on a current location of each LEO satellite, a first range of areas in which a spatial isolation angle between the LEO satellite and the GEO satellite does not satisfy a minimum spatial isolation angle within service areas of the movable spot beams of the transmitting and receiving user antennas, enabling the movable spot beams of the transmitting and receiving user antennas to not enter the areas in which the minimum spatial isolation angle is not satisfied, to reduce frequency interference between the movable spot beams of the transmitting and receiving user antennas of the LEO satellite and the GEO satellite;
  when the movable spot beams of the transmitting and receiving user antennas of multiple adjacent LEO satellites provide services to a same area, calculating a spatial isolation angle between the movable spot beams of the transmitting user antennas of any two adjacent LEO satellites and a spatial isolation angle between the movable spot beams of the receiving user antennas of the any two adjacent LEO satellites, and in response to the spatial isolation angle not satisfying a minimum acceptable spatial isolation angle in the communication satellite system, assigning different sub-frequencies to the movable spot beams that do not satisfy the minimum acceptable spatial isolation angle required in the communication satellite system, to reduce the frequency interference within the communication satellite system.

The disclosure further provides a communication satellite system, including multiple LEO satellites each provided with a transmitting user antenna for providing a downlink business beam service for users and a receiving user antenna for providing an uplink business beam service for the users. The transmitting user antenna and the receiving user antenna each includes multiple movable spot beams, each of the movable spot beams is configured as a sub-beam assigned with a different sub-frequency as needed, and the movable spot beam is configured to realize a sub-satellite user gazing or tracking function of the LEO satellite by dynamically adjusting a service area.

Based on a current location of each LEO satellite, a first range of areas in which a spatial isolation angle between the LEO satellite and the GEO satellite does not satisfy a minimum spatial isolation angle are determined within service areas of the movable spot beams of the transmitting and receiving user antennas, the movable spot beams of the transmitting and receiving user antennas are enabled to not enter (i.e., not cover or not radiate) the areas in which the minimum spatial isolation angle is not satisfied, to reduce frequency interference between the movable spot beams of the transmitting and receiving user antennas of the LEO satellite and the GEO satellite.

When the movable spot beams of the transmitting and receiving user antennas of multiple adjacent LEO satellites provide services to a same area, a spatial isolation angle between the movable spot beams of the transmitting user antennas of any two adjacent LEO satellites and a spatial isolation angle between the movable spot beams of the receiving user antennas of the any two adjacent LEO satellites are calculated, and in response to the spatial isolation angle not satisfying a minimum acceptable spatial isolation angle required in the communication satellite system, different sub-frequencies are assigned to the movable spot beams that do not satisfy the minimum acceptable spatial isolation angle required in the communication satellite system, to reduce the frequency interference within the communication satellite system.

DETAILED DESCRIPTION

Figure 1:
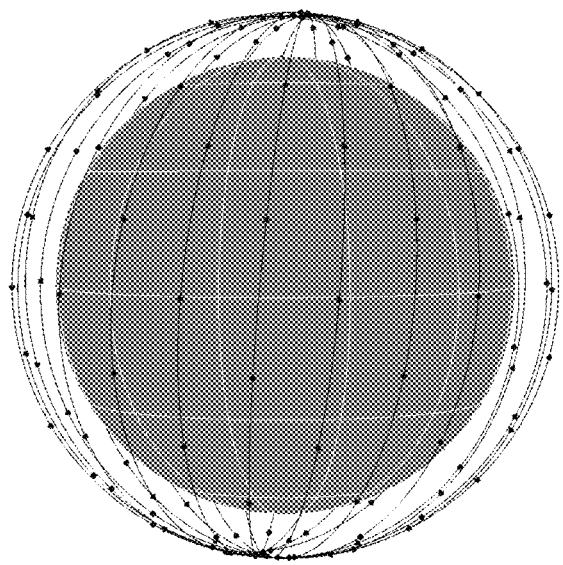
FIG. 1 is a schematic diagram of constellation configuration of a communication satellite system according to an embodiment of the disclosure.

The disclosure is described in detail below in combination with the accompanying drawings and specific embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the embodiments of the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

The embodiments of the disclosure are described in detail below, and examples of the embodiments are illustrated in the accompanying drawings, in which the same or similar numbers indicate the same or similar elements. The embodiments described below with reference to the accompanying drawings are exemplary and are intended to be used to explain the disclosure and are not to be construed as limiting the disclosure.

The current low-orbit communication satellite system is in a vigorous developing stage, and the ITU has proposed that the systems which are applied later need to coordinate their frequencies with the systems that have priority. For low-orbit communication satellite systems dedicated to providing continuous and uninterrupted services to users in any region within worldwide or a certain latitude range, it is extremely difficult to apply for dedicated spectrum in the frequency bands of Ku and Ka worldwide. Therefore, in order to share valuable frequency resources in the frequency bands of Ku and Ka with the GEO satellite, it is necessary to find an effective way to reduce frequency interference between the LEO satellites in the communication satellite system and a series of GEO satellites operating on the equator.

In order to use fewer LEO satellites to quickly develop an ability of providing continuous and uninterrupted services to the users in any region within worldwide or a certain latitude range, at a given satellite orbit altitude, transmitting and receiving antennas of the LEO satellites will use a beam half-angle of a larger beam coverage area to increase service range. The beam half-angle is generally selected according to a minimum acceptable beam communication elevation angle. In this case, the beam bias based method for reducing frequency interference between the LEO and GEO satellites proposed in the patent applications "Communication-Satellite System That Causes Reduced Interference (WO 2016/083894 A2)" and "Method For Sharing Radio Spectrum On Basis Of Beam Constant Offset, And Low-Orbit Communication Satellite System (No. 201910630504.4)" will not be applicable, because beams of the antennas are already selected according to the minimum acceptable communication elevation angle, and beam bias will make the beam communication function of the antennas abnormal.

The disclosure provides a method for reducing frequency interference between a communication satellite system and a GEO satellite and reducing frequency interference within the communication satellite system. The method includes:
configuring the communication satellite system containing multiple LEO satellites, each LEO satellite is provided with a transmitting user antenna for providing a downlink business beam service for users and a receiving user antenna for providing an uplink business beam service for the users, in which the transmitting user antenna and the receiving user antenna each includes multiple movable spot beams, each movable spot beam is configured as a sub-beam assigned with a different sub-frequency as needed, and the movable spot beams is configured to realize a sub-satellite user gazing or tracking function of the LEO satellite by dynamically adjusting a service area;
determining, based on a current location of each LEO satellite, a first range of areas in which a spatial isolation angle between the LEO satellite and the GEO satellite does not satisfy a minimum spatial isolation angle within service areas of the movable spot beams of the transmitting and receiving user antennas, enabling the movable spot beams of the transmitting and receiving user antennas to not enter the areas in which the minimum spatial isolation angle is not satisfied, to reduce frequency interference between the movable spot beams of the transmitting and receiving user antennas of the LEO satellite and the GEO satellite;
when the movable spot beams of the transmitting and receiving user antennas of multiple adjacent LEO satellites provide services to a same area, calculating a spatial isolation angle between the movable spot beams of the transmitting user antennas of any two adjacent LEO satellites and a spatial isolation angle between the movable spot beams of the receiving user antennas of the any two adjacent LEO satellites, and in response to the spatial isolation angle not satisfying a minimum acceptable spatial isolation angle in the communication satellite system, assigning different sub-frequencies to the movable spot beams that do not satisfy the minimum acceptable spatial isolation angle required in the communication satellite system, to reduce the frequency interference within the communication satellite system.

Optionally, the spatial isolation angle is an angle between two lines respectively connecting two satellites with a same sub-satellite location of an LEO satellite when both the two satellites provide services to the same sub-satellite location, the two satellites including 1 LEO satellite and 1 GEO satellite or including 2 adjacent LEO satellites in a constellation, and in response to the spatial isolation angle being greater than a preset angle, it is determined that frequency interference between the two satellites can be reduced to an acceptable degree.

Optionally, in order to obtain the first range of areas in which the spatial isolation angle between the current LEO satellite and the GEO satellite does not satisfy the minimum spatial isolation angle within a service area of the current LEO satellite, it is required to perform combination traversing on a beam service area of the current LEO satellite and each GEO satellite with frequency interference.

Optionally, perform combination traversing on each GEO satellite with the frequency interference and the beam service area of the current LEO satellite includes: assuming that a GEO satellite on an orbit with a certain inclination angle at any longitude location above the equator interferes with the LEO satellite, for an LEO satellite on a certain circular orbit, the areas in which the spatial isolation angle between the LEO satellite and each GEO satellite does not satisfy the minimum spatial isolation angle are not related to a longitude of the LEO satellite, but to a latitude, an orbit altitude and a beam coverage area of the LEO satellite, and after determining the orbit altitude and the beam coverage area of the LEO satellite, the areas in which the spatial isolation angle does not satisfy the minimum spatial isolation angle are only related to the latitude of the LEO satellite, but not to the longitude of the LEO satellite.

Optionally, in addition to the movable spot beams of the transmitting user antenna and the receiving user antenna, each LEO satellite is provided with a transmitting signaling antenna for providing a downlink signaling beam service for the users and a receiving signaling antenna for providing an uplink signaling beam service for the users, the transmitting signaling antenna and the receiving signaling antenna each has a signaling beam consisted of multiple signaling sub-beams, each signaling sub-beam is assigned with a different sub-frequency as needed, these signaling sub-beams further form a series of beam positions by means of time division service, the series of beam positions can realize spliced coverage of a sub-satellite service area of the LEO satellite, and sub-frequency isolation is carried out for different beam positions.

Optionally, after configuring the transmitting signaling antenna and the receiving signaling antenna for each LEO satellite, a second range of areas in which the spatial isolation angle between the LEO satellite and the GEO satellite does not satisfy the minimum spatial isolation angle is determined within a service area of the signaling beam of the LEO satellite, and signaling sub-beams corresponding to the second range of areas are turned off in time, to reduce frequency interference between the signaling beam of the LEO satellite and the GEO satellite.

Optionally, the transmitting signaling antenna and the receiving signaling antenna adopt a fine beam position division, to precisely determine a second range of areas in which the signaling sub-beams are to be turned off to reduce frequency interference with the GEO satellite within an entire sub-satellite coverage area corresponding to signaling beam of the LEO satellite, which is conducive to achieving more than one coverage of the ground globally or within a certain latitude range by splicing available beam positions in the signaling beams of adjacent LEO satellites.

Optionally, the signaling beam of the LEO satellite adopts a frequency spreading mechanism, and the signaling beams of different LEO satellites are assigned with different frequency spreading codes to reduce frequency interference when the signaling beams of the different LEO satellites form multi-coverage.

Optionally, constellation parameters of the communication satellite system are configured, including an LEO satellite orbital altitude, an LEO satellite orbital inclination angle, a beam range of the transmitting and receiving user antennas, a beam range of the transmitting and receiving signaling antennas, a number of constellation orbital planes, and a number of satellites in a constellation orbital plane, in which based on a multi-coverage characteristic of a constellation, when a sub-beam of a certain LEO satellite cannot provide services due to frequency interference with the GEO satellite, a sub-beam of an adjacent LEO satellite that does not have frequency interference with the GEO satellite will provide services, and the communication satellite system has an ability to provide continuous and uninterrupted services to the users in any region within worldwide or a certain latitude range.

Optionally, the beam range of each of the transmitting and receiving user antennas and the transmitting and receiving signaling antennas is selected according to a minimum acceptable beam communication elevation angle, which is conducive to completing initial construction of the communication satellite system using a minimum number of LEO satellites.

The disclosure further provides a communication satellite system, including multiple LEO satellites each provided with a transmitting user antenna for providing a downlink business beam service for users and a receiving user antenna for providing an uplink business beam service for the users. The transmitting user antenna and the receiving user antenna each includes multiple movable spot beams, each of the movable spot beams is configured as a sub-beam assigned with a different sub-frequency as needed, and the movable spot beam is configured to realize a sub-satellite user gazing or tracking function of the LEO satellite by dynamically adjusting a service area.

Based on a current location of each LEO satellite, a first range of areas in which a spatial isolation angle between the LEO satellite and the GEO satellite does not satisfy a minimum spatial isolation angle are determined within service areas of the movable spot beams of the transmitting and receiving user antennas, the movable spot beams of the transmitting and receiving user antennas are enabled to not enter (i.e., not cover or not radiate) the areas in which the minimum spatial isolation angle is not satisfied, to reduce frequency interference between the movable spot beams of the transmitting and receiving user antennas of the LEO satellite and the GEO satellite.

When the movable spot beams of the transmitting and receiving user antennas of multiple adjacent LEO satellites provide services to a same area, a spatial isolation angle between the movable spot beams of the transmitting user antennas of any two adjacent LEO satellites and a spatial isolation angle between the movable spot beams of the receiving user antennas of the any two adjacent LEO satellites are calculated, and in response to the spatial isolation angle not satisfying a minimum acceptable spatial isolation angle required in the communication satellite system, different sub-frequencies are assigned to the movable spot beams that do not satisfy the minimum acceptable spatial isolation angle required in the communication satellite system, to reduce the frequency interference within the communication satellite system.

Optionally, the spatial isolation angle refers to an angle between two lines respectively connecting two satellites with a same sub-satellite location of an LEO satellite when both the two satellites provide services to the same sub-satellite location. The two satellites are 1 LEO satellite and 1 GEO satellite or are 2 adjacent LEO satellites in a constellation, and in response to the spatial isolation angle being greater than a preset angle, it is determined that frequency interference between the two satellites can be reduced to an acceptable degree.

Optionally, in order to obtain the first range of areas in which the spatial isolation angle between the current LEO satellite and the GEO satellite does not satisfy the minimum spatial isolation angle within a service area of the current LEO satellite, it is required to perform combination traversing on each GEO satellite with frequency interference and a beam service area of the LEO satellite at the current location.

Optionally, perform the combination traversing on each GEO satellite with the frequency interference and the beam service area of the current LEO satellite includes: assuming that a GEO satellite on an orbit with a certain inclination angle at any longitude location above the equator interferes with the LEO satellite, for an LEO satellite on a certain circular orbit, the areas in which the spatial isolation angle between the LEO satellite and the GEO satellite does not satisfy the minimum spatial isolation angle are not related to a longitude of the LEO satellite, but to a latitude, an orbit altitude and a beam coverage area of the LEO satellite, and after determining the orbit altitude and the beam coverage area of the LEO satellite, the areas in which the spatial isolation angle does not satisfy the minimum spatial isolation angle are only related to the latitude of the LEO satellite, but not to the longitude of the LEO satellite.

Optionally, in addition to the movable spot beams of the transmitting user antenna and the receiving user antenna, each LEO satellite is provided with a transmitting signaling antenna for providing a downlink signaling beam service for the users and a receiving signaling antenna for providing an uplink signaling beam service for the users, the transmitting signaling antenna and the receiving signaling antenna each has a signaling beam consisted of multiple signaling sub-beams, each signaling sub-beam is assigned with a different sub-frequency as needed, these signaling sub-beams further form a series of beam positions by means of time division service, the series of beam positions can realize spliced coverage of a sub-satellite service area of the LEO satellite, and sub-frequency isolation is carried out for different beam positions.

Optionally, after configuring the transmitting signaling antenna and the receiving signaling antenna for each LEO satellite, a second range of areas in which the spatial isolation angle between the LEO satellite and the GEO satellite does not satisfy the minimum spatial isolation angle is determined within a service area of the signaling beam of the LEO satellite, and signaling sub-beams corresponding to the second range of areas are turned off in time, to reduce the frequency interference between the signaling beams of the LEO satellite and the GEO satellite.

Optionally, the transmitting signaling antenna and the receiving signaling antenna adopt a fine beam position division, to precisely determine a second range of areas in which the signaling sub-beams are to be turned off to reduce frequency interference with the GEO satellite within an entire sub-satellite coverage area corresponding to the signaling beams of the LEO satellite, which is conducive to achieving more than one coverage of the ground globally or within a certain latitude range by splicing available beam positions in the signaling beams of adjacent LEO satellites.

Optionally, the signaling beams of the LEO satellite adopts a frequency spreading mechanism, and the signaling beams of different LEO satellites are assigned with different frequency spreading codes to reduce frequency interference when the signaling beams of the LEO satellites form multi-coverage.

Optionally, constellation parameters of the communication satellite system are configured, including an LEO satellite orbital altitude, an LEO satellite orbital inclination angle, a beam range of the transmitting and receiving user antennas, a beam range of the transmitting and receiving signaling antennas, a number of constellation orbital planes, and a number of satellites in a constellation orbital plane, in which based on a multi-coverage characteristic of a constellation, when a sub-beam of a certain LEO satellite cannot provide services due to frequency interference with the GEO satellite, a sub-beam of an adjacent LEO satellite that does not have frequency interference with the GEO satellite will provide services, and the communication satellite system has an ability to provide continuous and uninterrupted services to the users worldwide or in any region within a certain latitude range.

Optionally, the beam range of each of the transmitting and receiving user antennas and the transmitting and receiving signaling antennas is selected according to a minimum acceptable beam communication elevation angle, which is conducive to completing initial construction of the communication satellite system using a minimum number of LEO satellites.

Optionally, after adding LEO satellites to the communication satellite system to increase a number of coverage layers to expand the system, it is expanded into a low-orbit communication satellite system with a same orbital inclination angle and altitude or a multi-layer low-orbit communication satellite system with different orbital inclination angles and altitudes, the expanded system can still achieve an effect of reducing the frequency interference between the LEO satellite and the GEO satellite, while continuing to achieve an effect of reducing the frequency interference between the LEO satellites in the communication satellite system.

Optionally, the transmitting and receiving user antennas adopt a phased array technology, and the movable spot beams of the transmitting and receiving user antennas provide services to the users by time-division beam hopping.

Optionally, the transmitting and receiving signaling antennas adopt a phased array technology, and the sub-beams of the transmitting and receiving signaling antennas form multiple beam positions by time division.

Optionally, dynamic information of the users within the service area is obtained in real time by beams of the transmitting and receiving signaling antennas, and available beams of the transmitting and receiving user antennas of the LEO satellites are deployed according to user needs for providing services.

Optionally, an inter-satellite link antenna and an earth-satellite feeding antenna are configured for the LEO satellites in the communication satellite system to form a communication satellite system with complete performance.

The advantages of the disclosure over the related art are described as follows.

1) The disclosure provides a method for reducing frequency interference between a communication satellite system and a GEO satellite and reducing frequency interference within the communication satellite system.
2) The beam service range of the antenna of the LEO satellite of the disclosure can be selected according to the minimum acceptable communication elevation angle, which is conducive to the use of a minimum number of satellites to provide continuous and uninterrupted services for the users any region within worldwide or in a certain latitude range.
3) The disclosure is suitable for stepwise construction and gradual increase of capacity of the communication satellite system.

The solution of the disclosure can reduce the frequency interference between the LEO satellite and the GEO satellite and the frequency interference within the communication satellite system. Meanwhile, transmitting and receiving user antennas and transmitting and receiving signaling antennas can select a beam half-angle of the maximum beam coverage area according to the minimum acceptable communication elevation angle, to support the use of fewer LEO satellites to rapidly develop the ability of providing the continuous and uninterrupted services to the users in any region within worldwide or a certain latitude range. In addition, after initial construction is completed, the current communication satellite system can be further expanded by adding a series of LEO satellites. The expansion solution can be flexibly chosen, for example, it can be expanded into a low-orbit communication satellite system with a same orbital inclination angle and altitude, or into a multi-layer low-orbit communication satellite system with different orbital inclination angles and altitudes. The expanded system according to the solution of the disclosure can still achieve an effect of reducing the frequency interference between the LEO satellite and the GEO satellite, and can also continue to achieve an effect of reducing the frequency interference among LEO satellites within the communication satellite system.

The preferred embodiment of the disclosure is a polar circular-orbit communication satellite system consisting of 144 LEO satellites, with an orbital altitude of 1200 km and an inclination angle of 85°, including 12 orbital planes each having 12 satellites located thereon. A phase difference between adjacent LEO satellites on the same orbital plane is 30°, and a phase angle difference between LEO satellites on different and adjacent orbital planes is 15°. The schematic diagram of constellation configuration of a low-orbit communication satellite system is shown in FIG. 1.

Each LEO satellite is equipped with a transmitting user antenna and a receiving user antenna based on a phased array antenna technology, and transmitting and receiving of the user antenna are separated. The transmitting user antenna provides a downlink business beam service to the user and has 8 movable spot beams supporting a wide scanning angle, and the receiving user antenna provides an uplink business beam service to the user and has 8 movable spot beams supporting the wide scanning angle. Each movable spot beam is configured as a sub-beam assigned with a different sub-frequency as needed. The movable spot beam can realize a sub-satellite user gazing or tracking function of the LEO satellite by dynamically adjusting a service area. When area gazing is performed, each movable spot beam of the transmitting or receiving user antenna can achieve real-time directional coverage of a certain area (e.g., 200 km*200 km area) within a sub-satellite spot beam coverage area. When performing gazing or dynamic tracking for a specific terminal, a narrower beam can be used to provide the uplink and downlink services to the users. When serving the same user, the movable spot beams of the transmitting user antenna and the receiving user antenna have the same coverage area of the ground and can be adjusted simultaneously. Each sub-beam of the transmitting user antenna and the receiving user antenna further forms 4 beam positions by time-division beam hopping to serve more users, and a single LEO satellite can serve users in up to 32 different sub-satellite areas.

Figure 2:
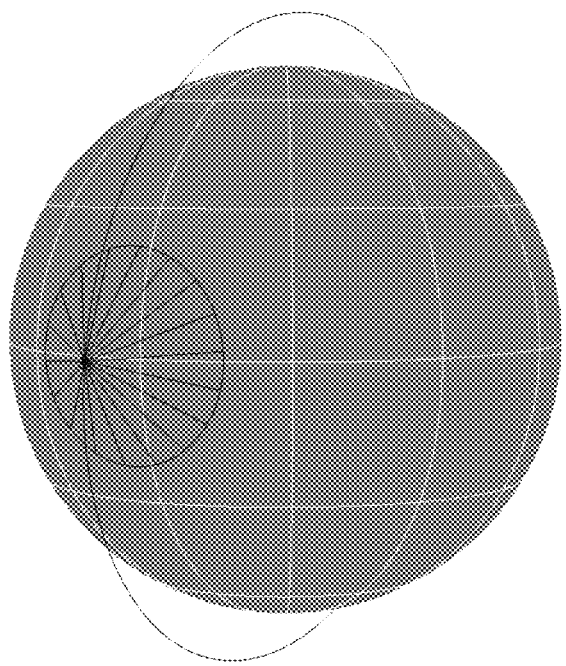
FIG. 2 is a schematic diagram of a serviceable beam coverage area of sub-satellite points of a transmitting user antenna and a receiving user antenna of a single LEO satellite in a communication satellite system according to an embodiment of the disclosure.

The serviceable beam coverage area of the sub-satellite points of the transmitting and receiving user antennas of a single LEO satellite is shown in FIG. 2. The serviceable beam coverage area of the transmitting and receiving user antennas is selected according to a minimum beam communication elevation angle of 15°. For a low-orbit constellation communication satellite system with an orbital altitude of 1200 km, a beam half-angle of a conical service area of the transmitting and receiving user antennas is 54.3870°. The 8 movable spot beams of the transmitting user antenna and the 8 movable spot beams of the receiving user antenna can perform dynamic scanning in this conical area. In an initial construction stage of the constellation, a poor communication elevation angle is selected, and an average communication elevation angle of the system will be further optimized after subsequent expansion of the communication satellite system by adding LEO satellites.

In order to provide good service to dynamic mobile users, each LEO satellite is equipped with a transmitting signaling antenna and a receiving signaling antenna based on the phased array antenna technology, the signaling antenna is a receiving and transmitting shared antenna. The transmitting signaling antenna is used to provide a downlink signaling beam service for the users, and the receiving signaling antenna is used to provide an uplink signaling beam service for the users. The beams of the transmitting and receiving signaling antennas are used to obtain dynamic information of the users within the service area in real time, and then the available beams of the transmitting and receiving user antennas of the LEO satellite are deployed for providing services according to user requirements.

Figure 3:
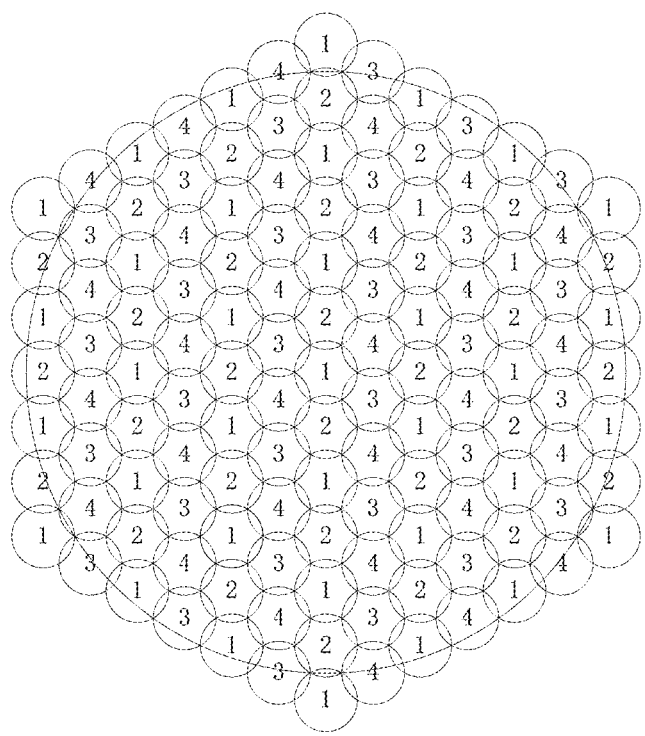
FIG. 3 is a schematic diagram of isolation of beam positions and sub-frequencies of a transmitting signaling antenna and a receiving signaling antenna according to an embodiment of the disclosure, in which the transmitting signaling antenna and the receiving signaling antenna use a same beam position division.

The size of the beam coverage area of the sub-satellite points of the transmitting and receiving signaling antennas is the same as that of the beam coverage area of the transmitting and receiving user antennas, and the beam half-angle of the conical beam coverage area is 54.3870°. The transmitting and receiving beams of the transmitting and receiving signaling antennas each includes 4 signaling sub-beams, and each signaling sub-beam can be assigned with a different sub-frequency as needed. The 4 signaling transmitting sub-beams of the transmitting signaling antenna and the 4 signaling receiving sub-beams of the receiving signaling antenna both form a relatively large number of 127 beam positions by time division, and these beam positions can complete spliced coverage of the sub-satellite area within the half-cone angle of 54.3870°. The transmitting and receiving signaling sub-beams corresponding to the beam positions in the center area have a full angle of 11.4183° and a half angle of 5.7092°. The transmitting signaling antenna and the receiving signaling antenna adopt the same beam position division, isolation of the beam positions and sub-frequencies of the transmitting signaling antenna and the receiving signaling antenna is shown in FIG. 3. When the sub-beams of adjacent beam positions work simultaneously, 4-color frequency isolation is used between different beam positions, and the numbers 1 to 4 within different beam positions indicate the corresponding sub-frequency serial numbers. The coverage area of each beam position of the transmitting and receiving signaling antennas is relatively fixed, which can complete the spliced coverage of the sub-satellite service area, while the corresponding sub-beam of each beam position can be flexibly controlled by a switch. The transmitting and receiving signaling antennas are divided into a relatively large number of fine beam positions, which is conducive to finely determining areas where the signaling sub-beams must be turned off to reduce frequency interference with the GEO satellite within all the sub-satellite coverage areas of the signaling beams of the LEO satellite, to achieve more than one coverage of the ground worldwide or within a certain latitude range by splicing available beam positions in the signaling beams of adjacent LEO satellites.

The spatial isolation angle refers to an angle between two lines respectively connecting two satellites with a same sub-satellite location of an LEO satellite when both the two satellites provide services to the same sub-satellite location. The two satellites may be 1 LEO satellite and 1 GEO satellite or may be 2 adjacent LEO satellites in a constellation.

For the common frequency bands of Ku and Ka, the beams of the receiving and transmitting antennas have excellent spatial angle selectivity, and the antennas can accomplish interference signal suppression within a spatial isolation angle less than a few degrees. When the spatial isolation angle is greater than a preset angle, it is determined that the frequency interference between two satellites can be reduced to an acceptable degree. For a specific communication satellite system, in order to reduce the frequency interference between the beams of the LEO satellite and the GEO satellite and reduce the frequency interference between the beams of different LEO satellites within the system, the minimum acceptable spatial isolation angle between the LEO satellite and the GEO satellite and the minimum acceptable spatial isolation angle between LEO satellites within the system need to be selected through detailed simulation analysis. These two minimum spatial isolation angles can be selected as the same angle or different angles as needed, the selection range is generally 8° to 15°. The larger the angle, the better it is to reduce frequency interference, meanwhile the greater the cost when constructing the communication satellite system.

To be conservative, in order to better reduce the frequency interference between the LEO satellite and the GEO satellite in the specific embodiment of the disclosure, the minimum acceptable spatial isolation angle between the LEO satellite and the GEO satellite is taken as 15°, and when the spatial isolation angle is greater than 15°, it is determined that the frequency interference between the LEO satellite and the GEO satellite can be reduced to an acceptable degree.

Figure 4:
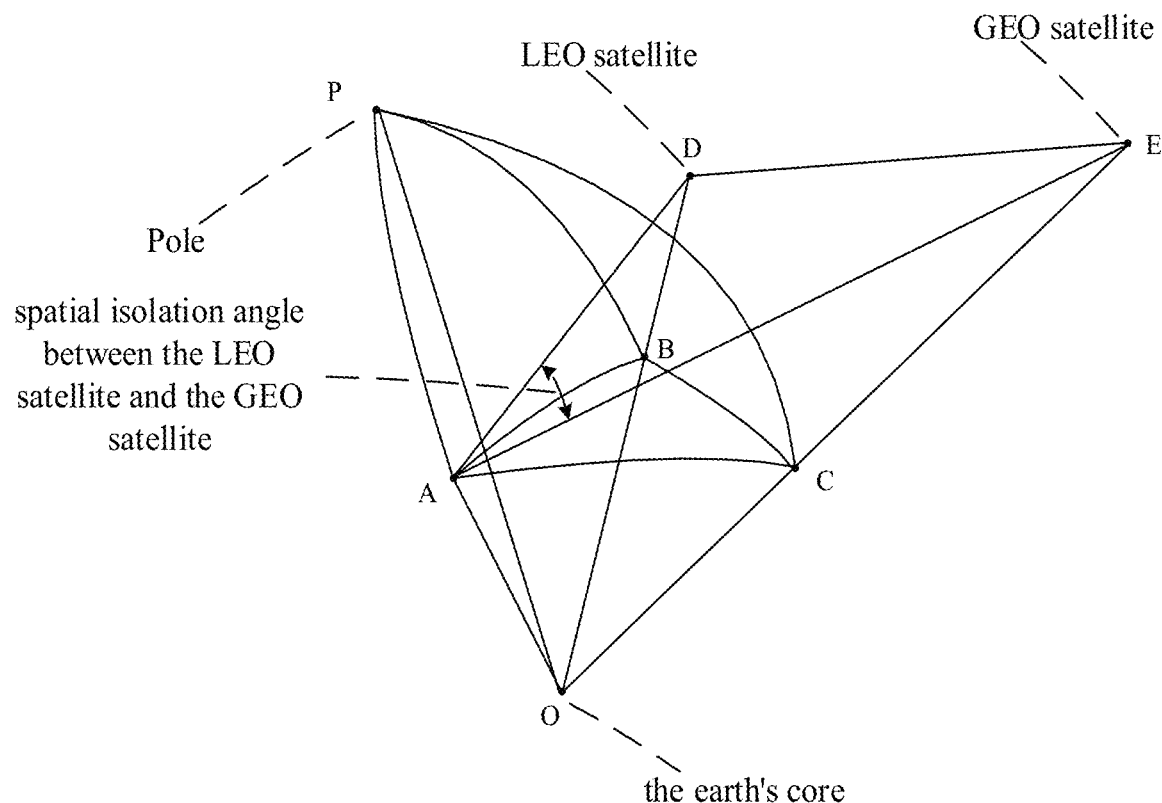
FIG. 4 is a schematic diagram of a spatial isolation angle between an LEO satellite and a GEO satellite.

The following contents are in combination with FIG. 4 to illustrate how to quickly calculate the spatial isolation angle with knowledge of latitude and longitude location parameters of two satellites when the beams of two satellites provide services to a certain location on the ground at the same time. For example, the spatial isolation angle ∠DAE between an LEO satellite orbiting to point D and a GEO satellite orbiting to point E for a location A on the ground.

1) The LEO satellite is orbiting to point D, and the location of its sub-satellite point is B. The GEO satellite is orbiting to point E, and the location of its sub-satellite point is C. P is the South Pole or the North Pole of the Earth. O is the Earth's core. For the location A that can be serviced by the LEO satellite, the spatial isolation angle between the LEO satellite and the GEO satellite is ∠DAE 2) For three points A, B and C on the Earth's surface, their latitude and longitude information are known, geocentric angles ∠AOP, ∠BOP and ∠COP corresponding to 3 great arc AP, BP and CP, and angles ∠APB, ∠APC and ∠BPC between three great circles are all known. If two sides of a spherical triangle and an angle are known, the geocentric angles ∠AOB, ∠AOC and ∠BOC corresponding to AB, AC and BC can be obtained according to the spherical triangle cosine theorem equation, where the size of ∠AOD is the same as that of ∠AOB, the size of ∠AOE is the same as that of ∠AOC, and the size of ∠DOE is the same as that of ∠BOC 3) On this basis, the radius of the Earth R (i.e., the distance between points A, B, C and the core O of the Earth), the altitude $L_{OD}$ of the LEO satellite to the core of the Earth (the distance between D where the LEO satellite is located and O), and the altitude $L_{OE}$ of the GEO satellite to the core of the Earth (the distance between E where the GEO satellite is located and O) are all known parameters. If two sides and an angle of a plane triangle are known, according to the plane triangle cosine theorem equation, the distance $L_{DA}$ between D where the LEO satellite is located and A, the distance $L_{EA}$ between E where the GEO satellite is located and A, and the distance $L_{DE}$ between D where the LEO satellite is located and E where the GEO satellite is located can be obtained. If three sides of a plane triangle are known, according to the plane triangle cosine theorem equation, the spatial isolation angle ∠DAE between the LEO satellite and the GEO satellite can be obtained.

The spherical triangle cosine theorem equation and the plane triangle cosine theorem equation mentioned in the above descriptions can be consulted in the relevant mathematical manuals, and will not be repeated in the description of specific embodiments of the disclosure.

Assuming that a GEO satellite on an orbit with a certain small inclination angle near any longitude location above the equator may have frequency interference with an LEO satellite orbiting to a certain latitude and longitude, in order to take the maximum envelope, for the LEO satellite at a certain latitude, all the GEO satellites above the equator are traversed and locations for which the spatial isolation angles between the LEO satellite and all the GEO satellites do not satisfy the minimum allowed spatial isolation angle are determined within the sub-satellite serviceable area of the LEO satellite at the current latitude and longitude, which will be described as follows.

Discretization is performed on the beam coverage area of the sub-satellite point of the LEO satellite orbiting to a certain latitude and longitude, and discretization is performed on a circular strip latitude and longitude area of a GEO satellite on an orbit with a certain small inclination angle above the equator. A central point of the discretized sub-area of the beam coverage area of the sub-satellite point of the LEO satellite is selected, and a spatial isolation angle between the central point and each of central points of all discretized sub-areas of the circular strip latitude and longitude area above the equator (assuming that a GEO satellite exists at each of the central points of the discretized sub-areas of the circular strip latitude and longitude area above the equator) is calculated. If the smallest spatial isolation angle among these spatial isolation angles is greater than a preset minimum acceptable spatial isolation angle between the LEO satellite and the GEO satellite, the corresponding sub-area is determined as belonging to a range of areas that satisfy the minimum acceptable spatial isolation angle, otherwise, the corresponding sub-area is determined as not belonging to the range of areas that satisfy the minimum acceptable spatial isolation angle. The previous calculation process is repeated and the discretized sub-areas of the beam service area of the sub-satellite point of the LEO satellite are traversed, to obtain the range of areas in which the spatial isolation angle between the LEO satellite orbiting to the certain latitude and longitude and all the GEO satellites does not satisfy the minimum acceptable spatial isolation angle within the beam coverage area the sub-satellite point of the LEO satellite.

Based on the above assumptions and analyses, for a certain circular-orbit LEO satellite, the areas in which the spatial isolation angles between it and all the GEO satellites do not satisfy the minimum spatial isolation angle are not related to a longitude of the LEO satellite, but to a latitude, an orbit altitude and a beam coverage area of the LEO satellite, and after determining the orbit altitude and the beam coverage area of the LEO satellite, the areas in which the spatial isolation angles do not satisfy the minimum spatial isolation angle are only related to the latitude of the LEO satellite, but not to the longitude of the LEO satellite.

In an embodiment of the disclosure, the LEO orbit is 1200 km from the ground, the conical beam service range of the transmitting and receiving user antennas and the conical beam service range of the transmitting and receiving signaling antennas are identical, and their half-cone angles are all 54.3870°, the minimum acceptable spatial isolation angle is selected to be 15°, and the maximum orbital inclination angle of the GEO satellite is selected to be 0.1°. By adopting the aforementioned method for determining the areas in which the spatial isolation angles between the LEO satellite orbiting to a certain latitude and longitude and all GEO satellites do not satisfy the minimum acceptable spatial isolation angle within the beam coverage area of the sub-satellite point of the LEO satellite, the potential area in which frequency interference with all the GEO satellites exists when the LEO satellite is located at different latitudes is dynamically changing. The south latitude and north latitude show a north-south symmetric change rule, which has nothing to do with the longitude location where the LEO satellite is located. After moving to a certain high latitude, the frequency interference with the GEO satellite no longer exists at any location within the beam service area of the LEO satellite. The specific situation is shown in FIGS. 5 to 17.

Figure 5:
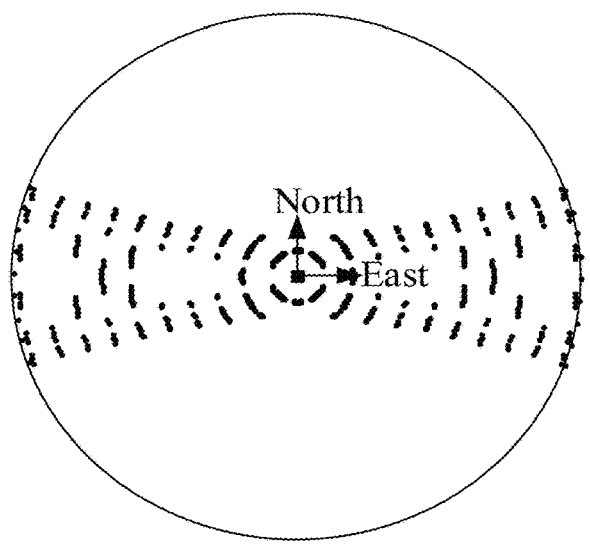
FIG. 5 is a schematic diagram of areas where frequency interference with a GEO satellite exists within coverage area of transmitting and receiving beams of user and signaling antennas of an LEO satellite at a latitude of 0° according to an embodiment of the disclosure.

FIG. 5 is a schematic diagram of areas where frequency interference with the GEO satellite exists within the coverage area of the transmitting and receiving beams of user and signaling antennas of an LEO satellite at a latitude of 0° according to an embodiment of the disclosure.

Figure 6:
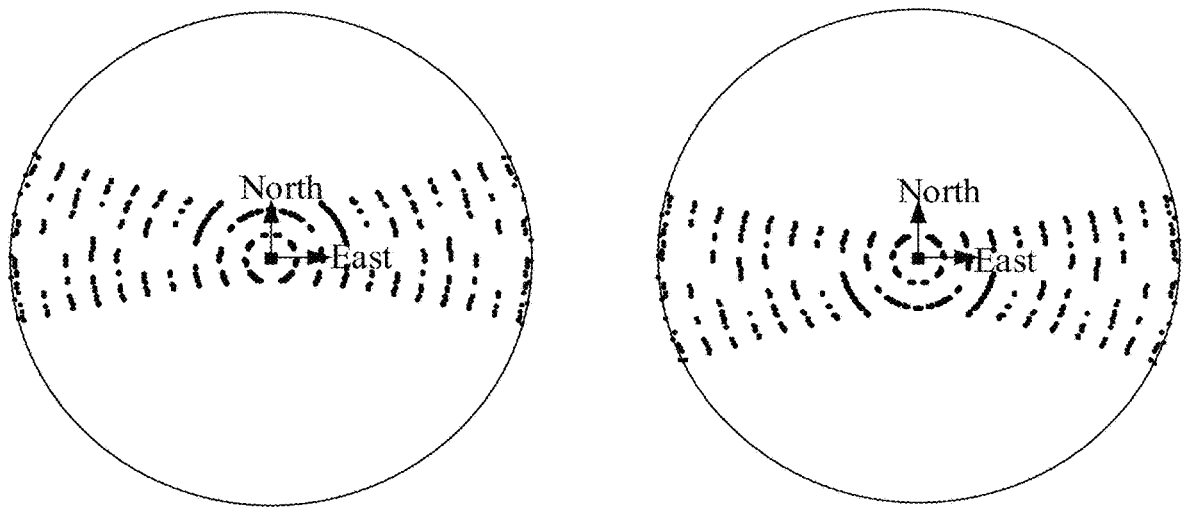
FIG. 6 is a schematic diagram of areas where frequency interference with a GEO satellite exists within coverage areas of transmitting and receiving beams of user and signaling antennas of an LEO satellite at a latitude of ±15° according to an embodiment of the disclosure, in which the shaded area in the left picture is the area where frequency interference with the GEO satellite exists when the LEO satellite is at the north latitude 5° (i.e., +5°), and the shaded area in the right picture is the area where frequency interference with the GEO satellite exists when the LEO satellite is at the south latitude 5° (i.e., −5°).

FIG. 6 is a schematic diagram of areas where frequency interference with a GEO satellite exists within coverage areas of transmitting and receiving beams of user and signaling antennas of an LEO satellite at a latitude of ±15° according to an embodiment of the disclosure, in which the shaded area in the left picture is the area where frequency interference with the GEO satellite exists when the LEO satellite is at the north latitude 5° (i.e., +5°), and the shaded area in the right picture is the area where frequency interference with the GEO satellite exists when the LEO satellite is at the south latitude 5° (i.e., −5°).

Figure 7:
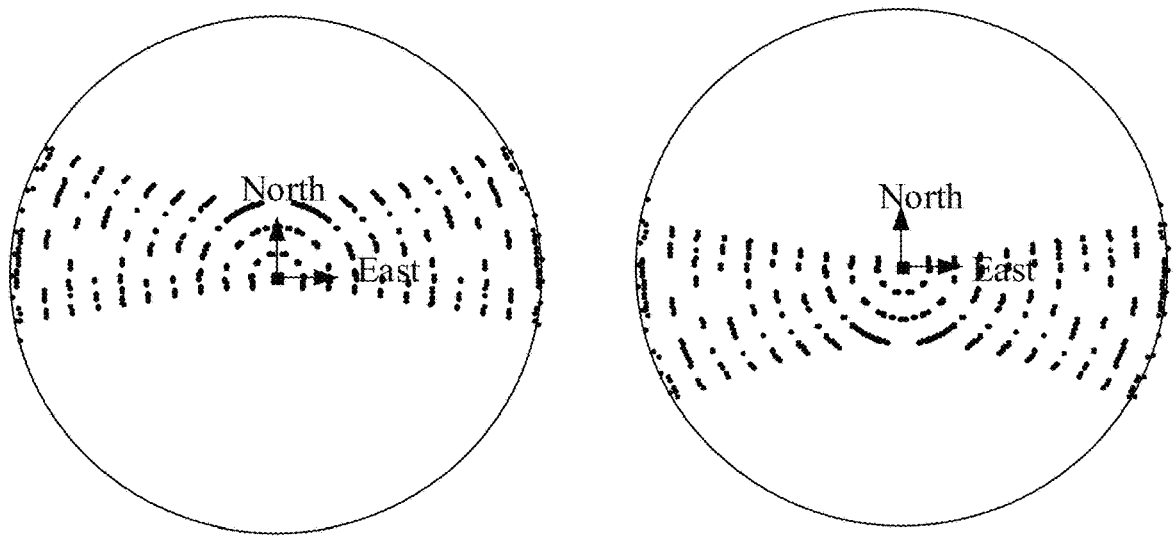
FIG. 7 is a schematic diagram of areas where frequency interference with a GEO satellite exists within coverage areas of transmitting and receiving beams of user and signaling antennas of an LEO satellite at a latitude of ±110° according to an embodiment of the disclosure, in which the shaded area in the left picture is the area where frequency interference with the GEO satellite exists when the LEO satellite is at the north latitude 10° (i.e., +10°), and the shaded area in the right picture is the area where frequency interference with the GEO satellite exists when the LEO satellite is at the south latitude 10° (i.e., −10°).

FIG. 7 is a schematic diagram of areas where frequency interference with a GEO satellite exists within coverage areas of transmitting and receiving beams of user and signaling antennas of an LEO satellite at a latitude of ±110° according to an embodiment of the disclosure, in which the shaded area in the left picture is the area where frequency interference with the GEO satellite exists when the LEO satellite is at the north latitude 10° (i.e., +10°), and the shaded area in the right picture is the area where frequency interference with the GEO satellite exists when the LEO satellite is at the south latitude 10° (i.e., −10°).

Figure 8:
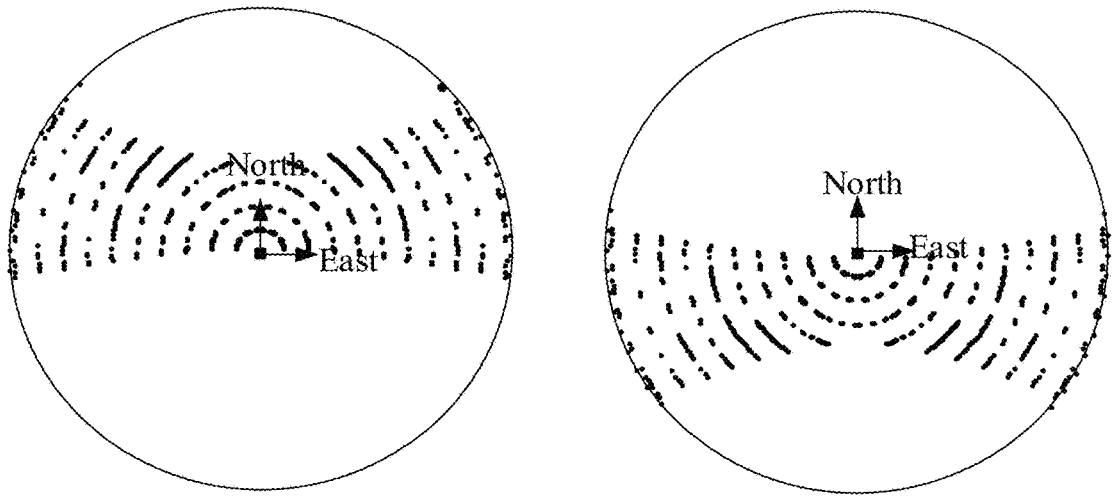
FIG. 8 is a schematic diagram of areas where frequency interference with a GEO satellite exists within coverage areas of transmitting and receiving beams of user and signaling antennas of an LEO satellite at a latitude of 15° according to an embodiment of the disclosure, in which the shaded area in the left picture is the area where frequency interference with the GEO satellite exists when the LEO satellite is at north the latitude 15° (i.e., +15°), and the shaded area in the right picture is the area where frequency interference with the GEO satellite exists when the LEO satellite is at the south latitude 15° (i.e., −15°).

FIG. 8 is a schematic diagram of areas where frequency interference with a GEO satellite exists within coverage areas of transmitting and receiving beams of user and signaling antennas of an LEO satellite at a latitude of 15° according to an embodiment of the disclosure, in which the shaded area in the left picture is the area where frequency interference with the GEO satellite exists when the LEO satellite is at north the latitude 15° (i.e., +15°), and the shaded area in the right picture is the area where frequency interference with the GEO satellite exists when the LEO satellite is at the south latitude 15° (i.e., −15°).

Figure 9:
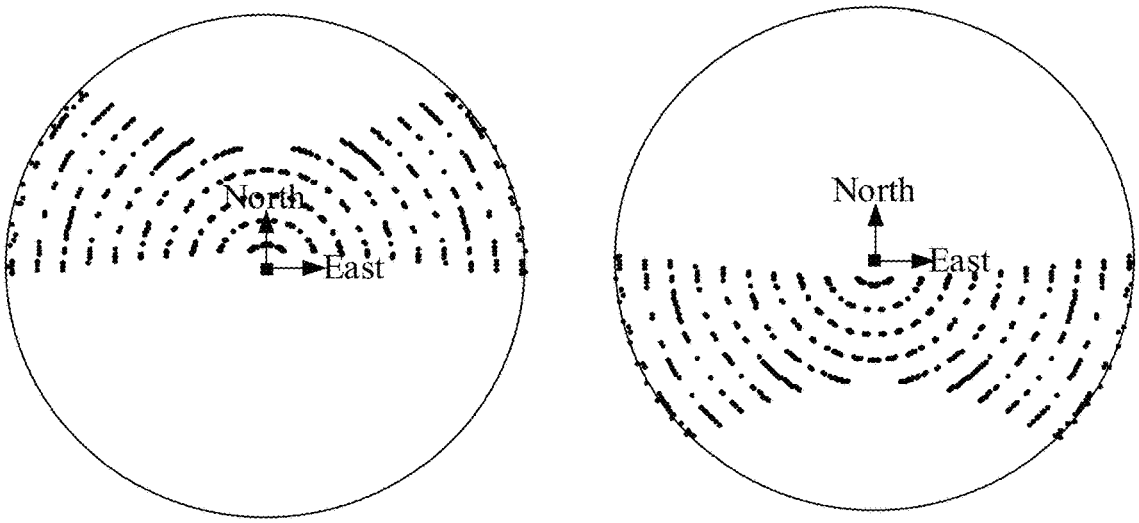
FIG. 9 is a schematic diagram of areas where frequency interference with a GEO satellite exists within coverage areas of transmitting and receiving beams of user and signaling antennas of an LEO satellite at a latitude of 20° according to an embodiment of the disclosure, in which the shaded area in the left picture is the area where frequency interference with the GEO satellite exists when the LEO satellite is at the north latitude 20° (i.e., +20°), and the shaded area in the right picture is the area where frequency interference with the GEO satellite exists when the LEO satellite is at the south latitude 20° (i.e., −20°).

FIG. 9 is a schematic diagram of areas where frequency interference with a GEO satellite exists within coverage areas of transmitting and receiving beams of user and signaling antennas of an LEO satellite at a latitude of 20° according to an embodiment of the disclosure, in which the shaded area in the left picture is the area where frequency interference with the GEO satellite exists when the LEO satellite is at the north latitude 20° (i.e., +20°), and the shaded area in the right picture is the area where frequency interference with the GEO satellite exists when the LEO satellite is at the south latitude 20° (i.e., −20°).

Figure 10:
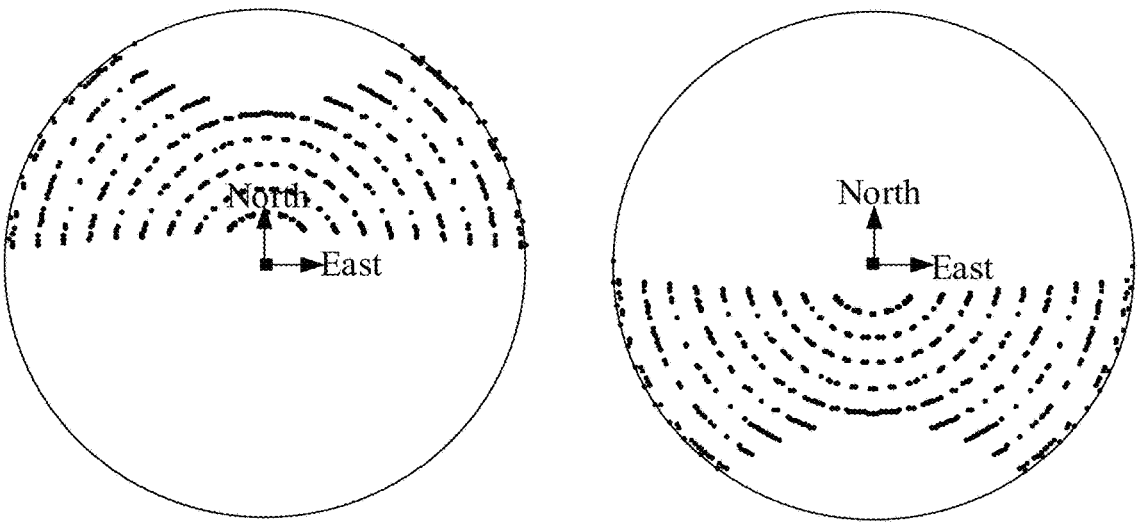
FIG. 10 is a schematic diagram of areas where frequency interference with a GEO satellite exists within coverage areas of transmitting and receiving beams of user and signaling antennas of an LEO satellite at a latitude of 25° according to an embodiment of the disclosure, in which the shaded area in the left picture is the area where frequency interference with the GEO satellite exists when the LEO satellite is at the north latitude 25° (i.e., +25°), and the shaded area in the right picture is the area where frequency interference with the GEO satellite exists when the LEO satellite is at the south latitude 25° (i.e., −25°).

FIG. 10 is a schematic diagram of areas where frequency interference with a GEO satellite exists within coverage areas of transmitting and receiving beams of user and signaling antennas of an LEO satellite at a latitude of 25° according to an embodiment of the disclosure, in which the shaded area in the left picture is the area where frequency interference with the GEO satellite exists when the LEO satellite is at the north latitude 25° (i.e., +25°), and the shaded area in the right picture is the area where frequency interference with the GEO satellite exists when the LEO satellite is at the south latitude 25° (i.e., −25°).

Figure 11:
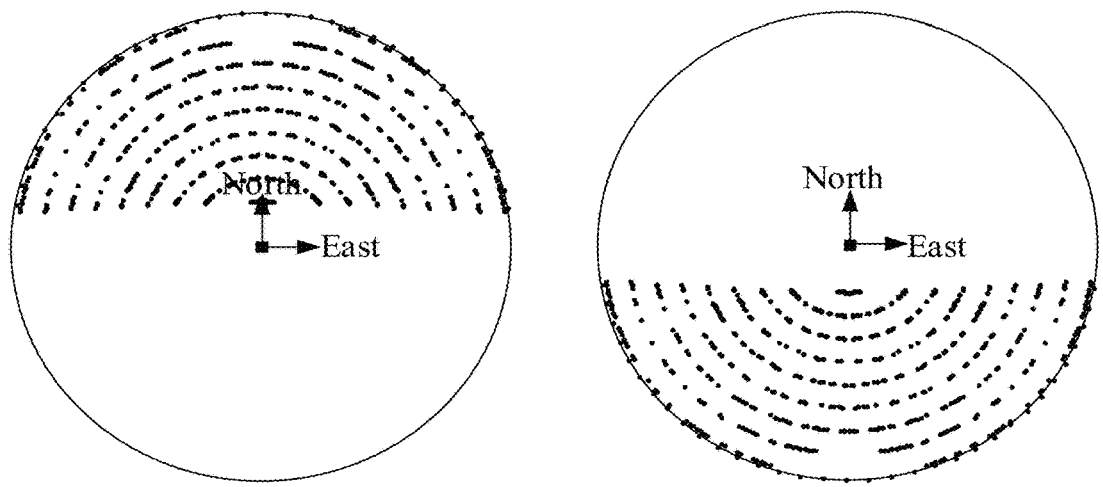
FIG. 11 is a schematic diagram of areas where frequency interference with a GEO satellite exists within coverage areas of transmitting and receiving beams of user and signaling antennas of an LEO satellite at a latitude of 30° according to an embodiment of the disclosure, in which the shaded area in the left picture is the area where frequency interference with the GEO satellite exists when the LEO satellite is at the north latitude 30° (i.e., +30°), and the shaded area in the right picture is the area where frequency interference with the GEO satellite exists when the LEO satellite is at the south latitude 30° (i.e., −30°).

FIG. 11 is a schematic diagram of areas where frequency interference with a GEO satellite exists within coverage areas of transmitting and receiving beams of user and signaling antennas of an LEO satellite at a latitude of 30° according to an embodiment of the disclosure, in which the shaded area in the left picture is the area where frequency interference with the GEO satellite exists when the LEO satellite is at the north latitude 30° (i.e., +30°), and the shaded area in the right picture is the area where frequency interference with the GEO satellite exists when the LEO satellite is at the south latitude 30° (i.e., −30°).

Figure 12:
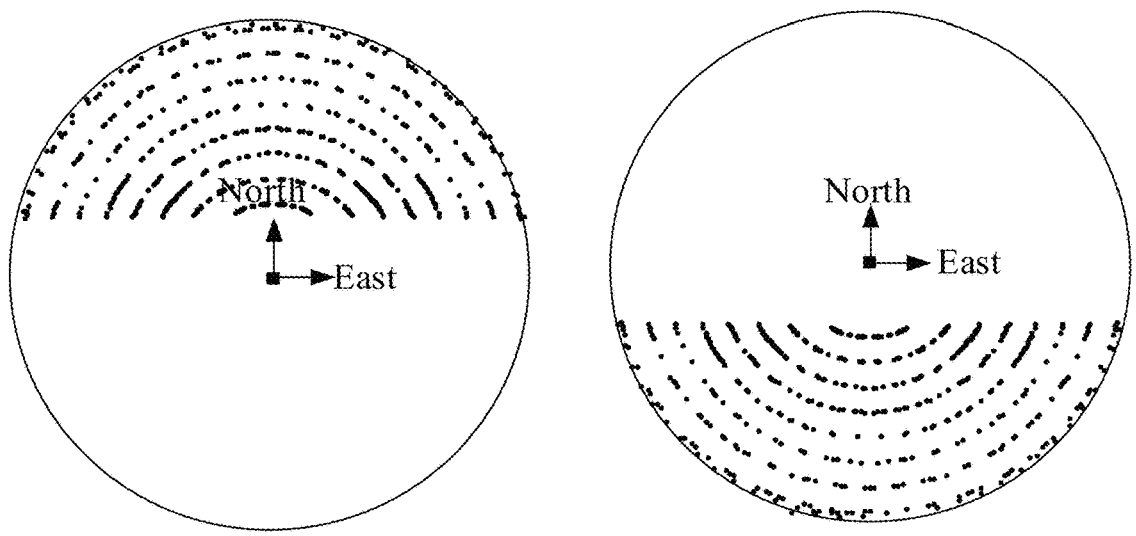
FIG. 12 is a schematic diagram of areas where frequency interference with a GEO satellite exists within coverage areas of transmitting and receiving beams of user and signaling antennas of an LEO satellite at a latitude of 35° according to an embodiment of the disclosure, in which the shaded area in the left picture is the area where frequency interference with the GEO satellite exists when the LEO satellite is at the north latitude 35° (i.e., +35°), and the shaded area in the right picture is the area where frequency interference with the GEO satellite exists when the LEO satellite is at the south latitude 35° (i.e., −35°).

FIG. 12 is a schematic diagram of areas where frequency interference with a GEO satellite exists within coverage areas of transmitting and receiving beams of user and signaling antennas of an LEO satellite at a latitude of 35° according to an embodiment of the disclosure, in which the shaded area in the left picture is the area where frequency interference with the GEO satellite exists when the LEO satellite is at the north latitude 35° (i.e., +35°), and the shaded area in the right picture is the area where frequency interference with the GEO satellite exists when the LEO satellite is at the south latitude 35° (i.e., −35°).

Figure 13:
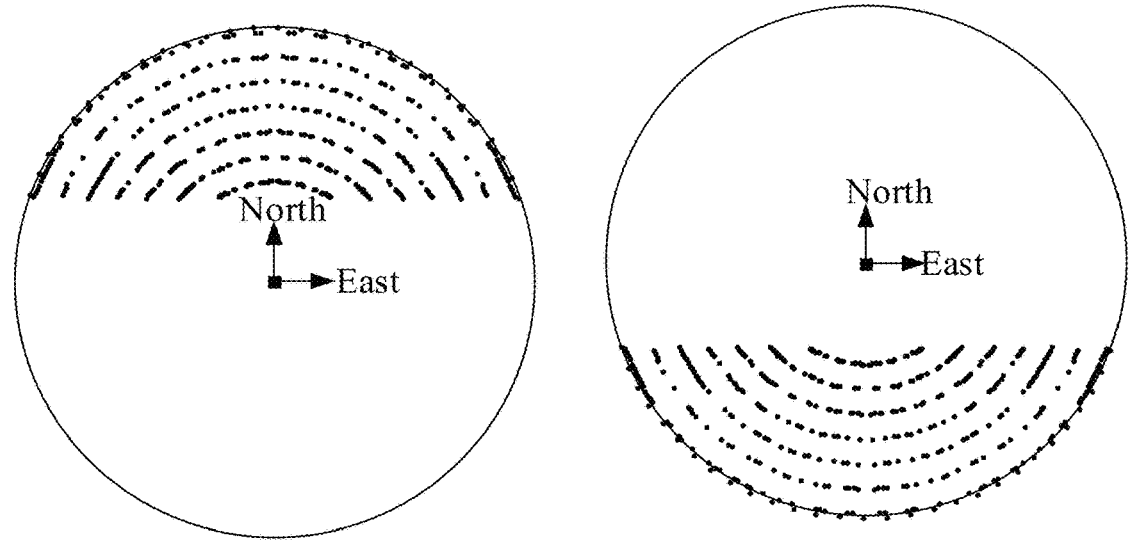
FIG. 13 is a schematic diagram of areas where frequency interference with a GEO satellite exists within coverage areas of transmitting and receiving beams of user and signaling antennas of an LEO satellite at a latitude of 40° according to an embodiment of the disclosure, in which the shaded area in the left picture is the area where frequency interference with the GEO satellite exists when the LEO satellite is at the north latitude 40° (i.e., +40°), and the shaded area in the right picture is the area where frequency interference with the GEO satellite exists when the LEO satellite is at the south latitude 40° (i.e., −40°).

FIG. 13 is a schematic diagram of areas where frequency interference with a GEO satellite exists within coverage areas of transmitting and receiving beams of user and signaling antennas of an LEO satellite at a latitude of 40° according to an embodiment of the disclosure, in which the shaded area in the left picture is the area where frequency interference with the GEO satellite exists when the LEO satellite is at the north latitude 40° (i.e., +40°), and the shaded area in the right picture is the area where frequency interference with the GEO satellite exists when the LEO satellite is at the south latitude 40° (i.e., −40°).

Figure 14:
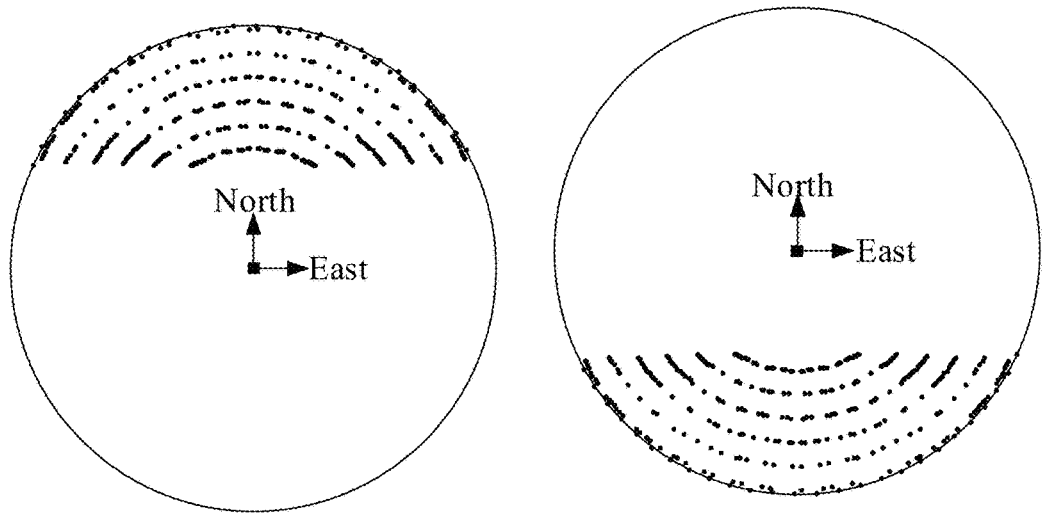
FIG. 14 is a schematic diagram of areas where frequency interference with a GEO satellite exists within coverage areas of transmitting and receiving beams of user and signaling antennas of an LEO satellite at a latitude of 45° according to an embodiment of the disclosure, in which the shaded area in the left picture is the area where frequency interference with the GEO satellite exists when the LEO satellite is at the north latitude 45° (i.e., +45°), and the shaded area in the right picture is the area where frequency interference with the GEO satellite exists when the LEO satellite is at the south latitude 45° (i.e., −45°).

FIG. 14 is a schematic diagram of areas where frequency interference with a GEO satellite exists within coverage areas of transmitting and receiving beams of user and signaling antennas of an LEO satellite at a latitude of 45° according to an embodiment of the disclosure, in which the shaded area in the left picture is the area where frequency interference with the GEO satellite exists when the LEO satellite is at the north latitude 45° (i.e., +45°), and the shaded area in the right picture is the area where frequency interference with the GEO satellite exists when the LEO satellite is at the south latitude 45° (i.e., −45°).

Figure 15:
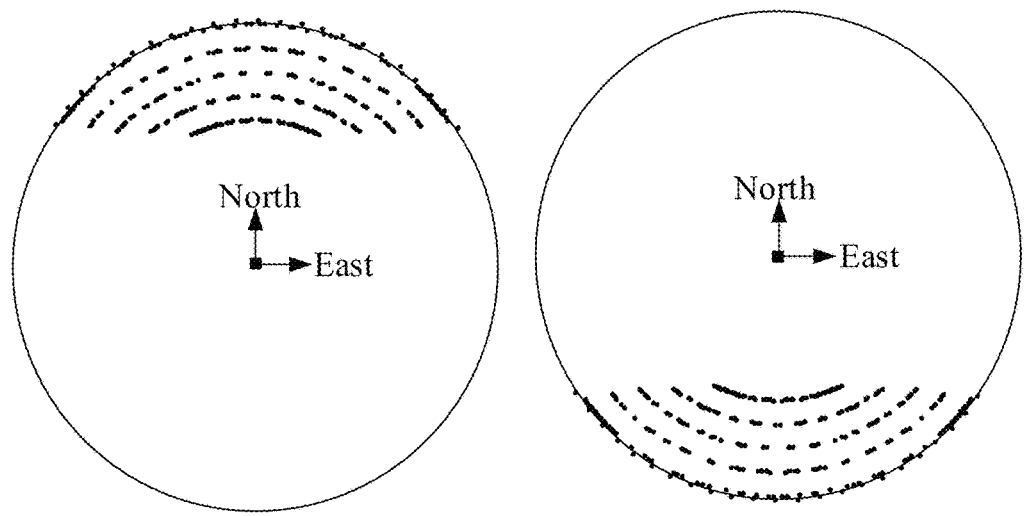
FIG. 15 is a schematic diagram of areas where frequency interference with a GEO satellite exists within coverage areas of transmitting and receiving beams of user and signaling antennas of an LEO satellite at a latitude of 50° according to an embodiment of the disclosure, in which the shaded area in the left picture is the area where frequency interference with the GEO satellite exists when the LEO satellite is at the north latitude 50° (i.e., +50°), and the shaded area in the right picture is the area where frequency interference with the GEO satellite exists when the LEO satellite is at the south latitude 50° (i.e., −50°).

FIG. 15 is a schematic diagram of areas where frequency interference with a GEO satellite exists within coverage areas of transmitting and receiving beams of user and signaling antennas of an LEO satellite at a latitude of 50° according to an embodiment of the disclosure, in which the shaded area in the left picture is the area where frequency interference with the GEO satellite exists when the LEO satellite is at the north latitude 50° (i.e., +50°), and the shaded area in the right picture is the area where frequency interference with the GEO satellite exists when the LEO satellite is at the south latitude 50° (i.e., −50°).

Figure 16:
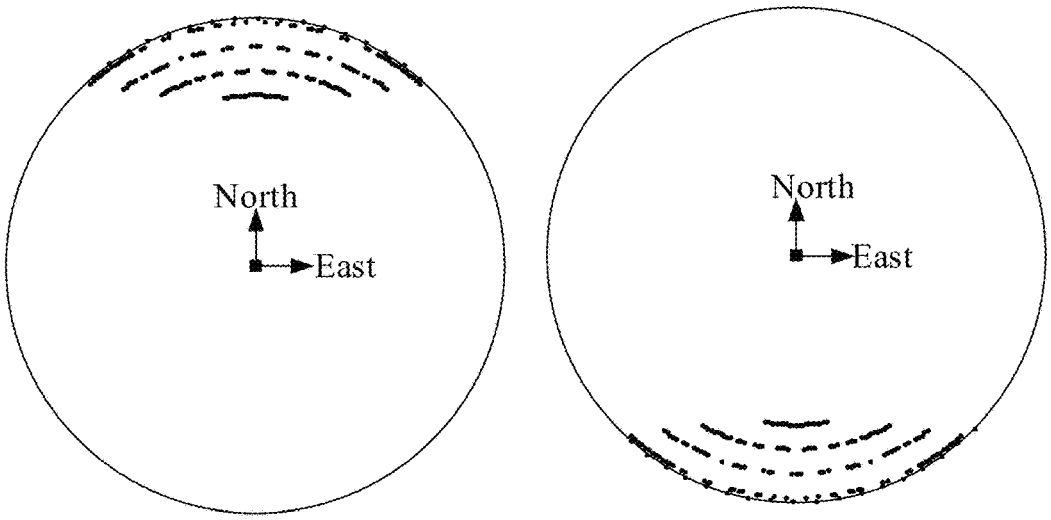
FIG. 16 is a schematic diagram of areas where frequency interference with a GEO satellite exists within coverage areas of transmitting and receiving beams of user and signaling antennas of an LEO satellite at a latitude of 55° according to an embodiment of the disclosure, in which the shaded area in the left picture is the area where frequency interference with the GEO satellite exists when the LEO satellite is at the north latitude 55° (i.e., +55°), and the shaded area in the right picture is the area where frequency interference with the GEO satellite exists when the LEO satellite is at the south latitude 55° (i.e., −55°).

FIG. 16 is a schematic diagram of areas where frequency interference with a GEO satellite exists within coverage areas of transmitting and receiving beams of user and signaling antennas of an LEO satellite at a latitude of 55° according to an embodiment of the disclosure, in which the shaded area in the left picture is the area where frequency interference with the GEO satellite exists when the LEO satellite is at the north latitude 55° (i.e., +55°), and the shaded area in the right picture is the area where frequency interference with the GEO satellite exists when the LEO satellite is at the south latitude 55° (i.e., −55°).

Figure 17:
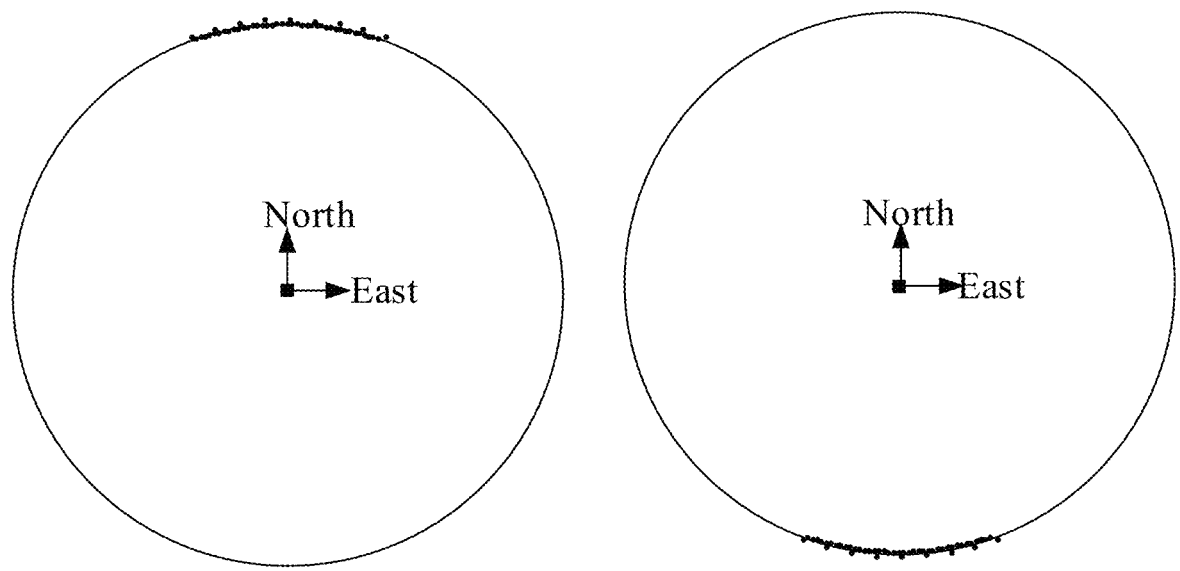
FIG. 17 is a schematic diagram of areas where frequency interference with a GEO satellite exists within coverage areas of transmitting and receiving beams of user and signaling antennas of an LEO satellite at a latitude of 60° according to an embodiment of the disclosure, in which the shaded area in the left picture is the area where frequency interference with the GEO satellite exists when the LEO satellite is at the north latitude 60° (i.e., +60°), and the shaded area in the right picture is the area where frequency interference with the GEO satellite exists when the LEO satellite is at the south latitude 60° (i.e., −60°).

FIG. 17 is a schematic diagram of areas where frequency interference with a GEO satellite exists within coverage areas of transmitting and receiving beams of user and signaling antennas of an LEO satellite at a latitude of 60° according to an embodiment of the disclosure, in which the shaded area in the left picture is the area where frequency interference with the GEO satellite exists when the LEO satellite is at the north latitude 60° (i.e., +60°), and the shaded area in the right picture is the area where frequency interference with the GEO satellite exists when the LEO satellite is at the south latitude 60° (i.e., −60°).

The above calculation process can be processed in advance to facilitate subsequent use by means of querying the latitude of the LEO satellite.

In the embodiment of the disclosure, the communication satellite system has a characteristic of multi-coverage of the ground, at least two or even more than four coverage, when the beams of the transmitting and receiving user antennas and the beams of the transmitting and receiving signaling antennas between adjacent LEO satellites on the same orbit and on different orbits can be used normally without considering the limitation of frequency interference with the GEO satellite.

When the LEO satellite is orbiting to a different latitude, if the specific potential area where the frequency interference with the GEO satellite exists within the beam coverage area of the transmitting and receiving user antennas and the transmitting and receiving signaling antennas is known, the movable spot beams of the transmitting and receiving user antennas and the sub-beams of the transmitting and receiving signaling antennas within the area where the frequency interference with the GEO satellite exists can be turned off in advance, to ensure that the frequency interference with the GEO satellite can be reduced to an acceptable degree. Meanwhile, the reasonable design and utilization of the characteristic of the multiple-coverage of the ground within the constellation of the communications satellite system may ensure that when the current LEO satellite is unable to provide user beam service and signaling beam service to a certain area, the user beams and signaling beams of more than one adjacent LEO satellite are available in that area.

Figure 18:
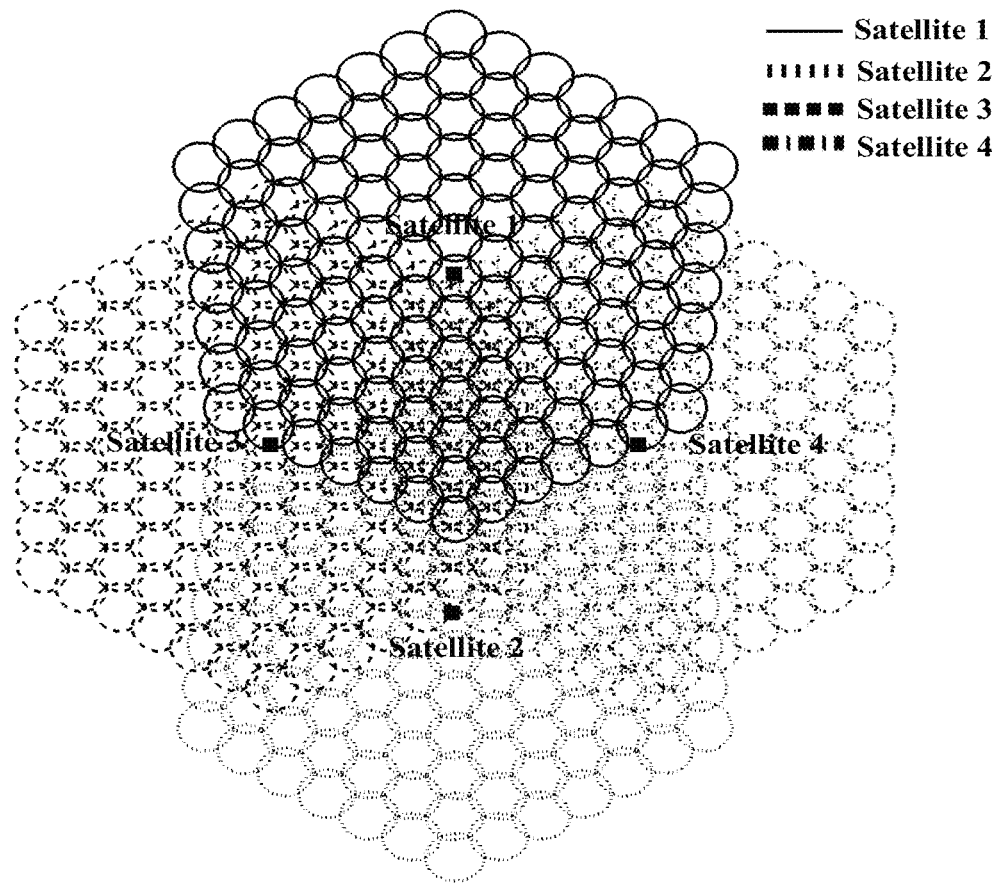
FIG. 18 is a schematic diagram of multi-coverage of beam positions of transmitting and receiving signaling antenna beams of four LEO satellites adjacent in the direction from front to back and the direction from left to right near the equator when the beam positions of the transmitting and receiving signaling antenna beams are all turned on without considering frequency interference between the LEO satellite and the GEO satellite according to an embodiment of the disclosure.

For the communication satellite system in the embodiment of the disclosure, taking the beams of the transmitting and receiving signaling antennas as an example, FIG. 18 shows the multi-coverage of beam positions of signaling beams of 4 LEO satellites (Satellite 1 to Satellite 4) adjacent in the direction from front to back and the direction from left to right near the equator without considering the limitation of frequency interference with the GEO satellite.

If a certain beam position of the transmitting and receiving signaling antennas of the LEO satellite has an intersection with the area where frequency interference with the GEO satellite exists, the transmitting and receiving signaling sub-beams corresponding to the current beam position must be turned off. For the 4 adjacent LEO satellites (Satellite 1 to Satellite 4) adjacent in the direction from front to back and the direction from left to right near the equator, the coverage of the signaling beams in the event that part of the beam positions is unavailable is shown in FIG. 19.

Figure 19:
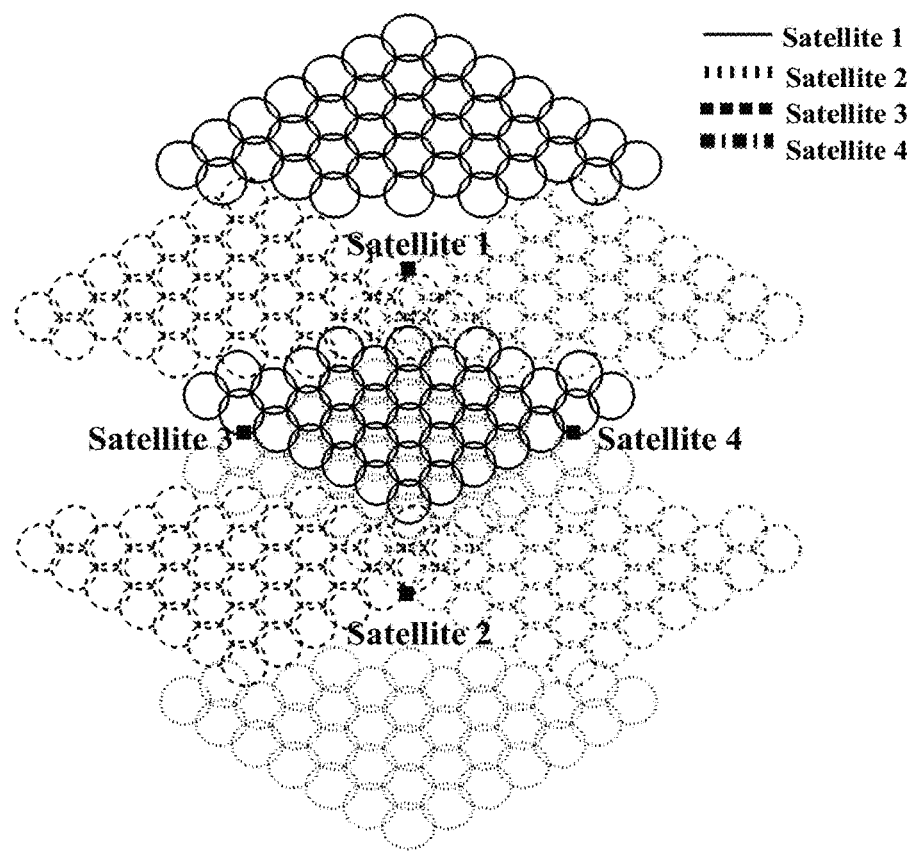
FIG. 19 is a schematic diagram of multi-coverage of beam positions of transmitting and receiving signaling antenna beams of four LEO satellites adjacent in the direction from front to back and the direction from left to right near the equator after part of the beam positions of the transmitting and receiving signaling antenna beams are turned off for reducing frequency interference between the LEO satellite and the GEO satellite according to an embodiment of the disclosure.
Figure 20:
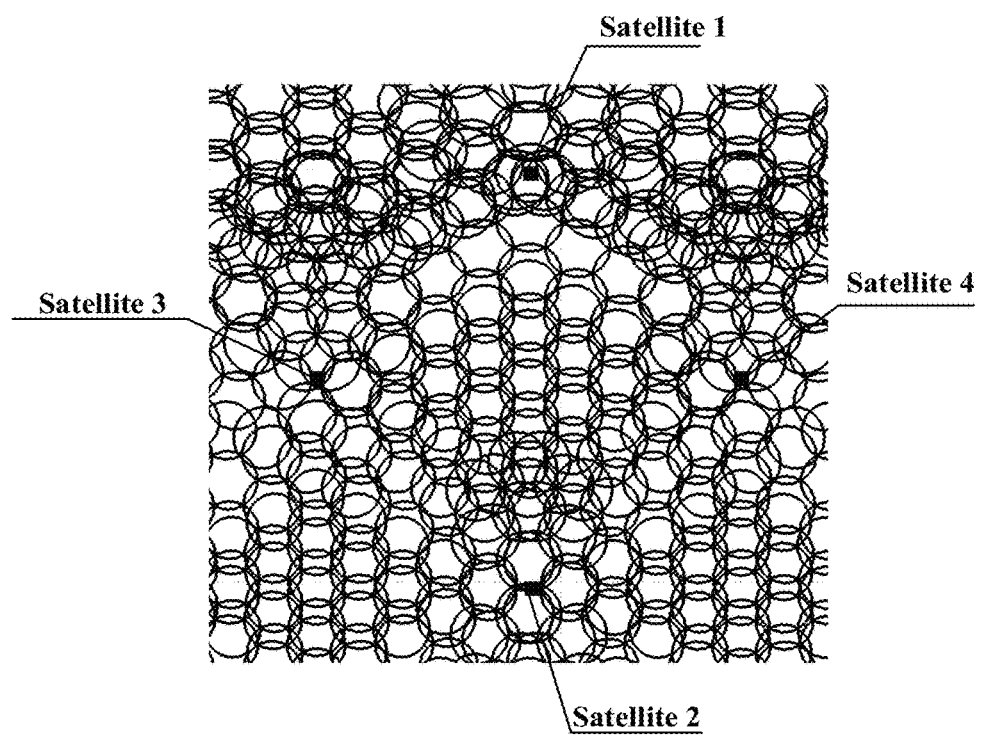
FIG. 20 shows a complete coverage of signaling beams near sub-satellite points of satellites 1, 2, 3, and 4 after part of the beam positions of transmitting and receiving signaling antennas are turned off in order to reduce frequency interference between the LEO satellite and the GEO satellite according to an embodiment of the disclosure, it is on the basis of FIG. 19 and supplemented with available beam positions of transmitting and receiving signaling antennas of other LEO satellites adjacent in the direction from front to back within the same orbital plane as satellites 3 and 4, such that after removing unavailable beam positions due to the frequency interference, it is still possible to achieve more than one coverage.

On the basis of FIG. 19, after supplementing the available beam positions of the transmitting and receiving signaling beams of other 4 adjacent LEO satellites adjacent in the direction from front to back on the same orbit as satellites 3 and 4, the complete coverage of the signaling beams in the vicinity of sub-satellite points of the satellites 1, 2, 3 and 4 is shown in FIG. 20. After calibration, the unavailable beam positions of the transmitting and receiving signaling antennas located in the area where the frequency interference with the GEO satellite exists are turned off, the available beam positions of the transmitting and receiving signaling antennas of all 144 LEO satellites in the embodiments of the disclosure are superimposed to have more than one coverage of the ground.

The dynamic information of the users in the service area is acquired in real time through the signaling beams of the transmitting and receiving signaling antennas, and subsequently the available movable spot beams of the transmitting and receiving user antennas of the LEO satellite are deployed for providing services according to the user demand. After calibration, the movable spot beams of the transmitting and receiving user antennas located in the area where the frequency interference with the GEO satellite exists are turned off, the available areas of the movable spot beams of the transmitting and receiving user antennas of all 144 LEO satellites in the embodiments of the disclosure are superimposed to have more than one coverage of the ground.

When a sub-beam of an LEO satellite is unable to provide service due to frequency interference with the GEO satellite, service is provided by a sub-beam of an adjacent LEO satellite that does not have frequency interference with the GEO satellite, and the communication satellite system of the embodiment of the disclosure thus has the ability of providing continuous and uninterrupted services to the users in any region within worldwide or a certain latitude range.

The beams of the transmitting and receiving signaling antennas of the LEO satellite all adopt a frequency spreading mechanism, and different LEO satellites are assigned with different frequency spreading codes. This frequency spreading mechanism can solve the frequency interference problem when the signaling beams of multiple LEO satellites provide services to one area at the same time.

When the movable spot beams of the transmitting and receiving user antennas of several adjacent LEO satellites are required to provide services to the users in the same area, if the spatial isolation angle between two sub-beams of the transmitting user antenna and the receiving user antenna does not satisfy the minimum acceptable spatial isolation angle between different LEO satellites within the communication satellite system (considering that various influencing factors in the system are relatively controllable, the minimum acceptable spatial isolation angle between different LEO satellites in the communication satellite system can be relatively small, which is 8° in the embodiment of the disclosure), the frequency interference problem between different LEO satellites in the communication satellite system is solved by assigning different sub-frequencies to the user sub-beams.

In the embodiment, the communication satellite system can be further expanded, for example, a series of LEO satellites at other orbital altitudes and with a smaller orbital inclination angle can be further added on the basis of the original system, which can be expanded into a multi-layer constellation system in which the number of coverage layers are greatly increased for low latitude areas. The expanded system can still solve the frequency interference problem between i) the movable spot beams of the transmitting and receiving user antennas and the sub-beams of the transmitting and receiving signaling antennas of the LEO satellite and ii) the GEO satellite by using the aforementioned method, meanwhile there is of frequency interference problem between the movable spot beams of the transmitting and receiving user antennas and the sub-beams of the transmitting and receiving signaling antennas of the LEO satellite in the original system as well as in the newly expanded system.

After the communication satellite system is expanded, the number of LEO satellites available at the same moment is further increased for the ground users, and the LEO satellite with a larger communication elevation angle can be used preferably to provide services, and the average communication elevation angle of the system will be significantly optimized.

In the embodiments of the disclosure, the LEO satellite in the communication satellite system can be further configured with an inter-satellite link antenna and an earth-satellite feeding antenna to form a communication satellite system with more complete performance.

The transmitting and receiving user antennas and the transmitting and receiving signaling antennas of the LEO satellite in the embodiments of the disclosure can share valuable frequency resources (such as the frequency bands of Ku and Ka) with the GEO satellite.

The disclosure gives only one illustrative embodiment, and numerous variations of the invention can be designed by those skilled in the art with ease, and the scope of the disclosure is limited by the appended claims.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for reducing frequency interference between a communication satellite system and a Geostationary Earth Orbits (GEO) satellite and reducing frequency interference within the communication satellite system, comprising:

configuring the communication satellite system containing a plurality of Low Earth Orbit (LEO) satellites, wherein each LEO satellite is provided with a transmitting user antenna for providing a downlink business beam service for users and a receiving user antenna for providing an uplink business beam service for the users, wherein the transmitting user antenna and the receiving user antenna each comprises a plurality of movable spot beams, each movable spot beam is configured as a sub-beam assigned with a different sub-frequency as needed, and the movable spot beam is configured to realize a sub-satellite user gazing or tracking function of the LEO satellite by dynamically adjusting a service area;

determining, based on a current location of each LEO satellite, a first range of areas in which a spatial isolation angle between the LEO satellite and the GEO satellite does not satisfy a minimum spatial isolation angle within service areas of the movable spot beams of the transmitting and receiving user antennas, enabling the movable spot beams of the transmitting and receiving user antennas to not enter the areas in which the minimum spatial isolation angle is not satisfied, to reduce frequency interference between the movable spot beams of the transmitting and receiving user antennas of the LEO satellite and the GEO satellite; and when the movable spot beams of the transmitting user antennas and the receiving user antennas of a plurality of adjacent LEO satellites provide services to a same area, calculating a spatial isolation angle between the movable spot beams of the transmitting user antennas of any two adjacent LEO satellites and a spatial isolation angle between the movable spot beams of the receiving user antennas of the any two adjacent LEO satellites, and in response to the spatial isolation angle not satisfying the minimum spatial isolation angle, assigning different sub-frequencies to the movable spot beams that do not satisfy the minimum spatial isolation angle, to reduce frequency interference within the communication satellite system.

2. The method of claim 1, wherein the spatial isolation angle is an angle between two lines respectively connecting two satellites with a same sub-satellite location of an LEO satellite when both the two satellites provide services to the same sub-satellite location, wherein the two satellites include one LEO satellite and one GEO satellite or include two adjacent LEO satellites in a constellation; and in response to the spatial isolation angle being greater than a preset angle, it is determined that frequency interference between the two satellites can be reduced to an acceptable degree.

3. The method of claim 1, wherein determining, based on the current location of each LEO satellite, the first range of areas in which the spatial isolation angle between the LEO satellite and the GEO satellite does not satisfy the minimum spatial isolation angle within the service areas of the movable spot beams of the transmitting and receiving user antennas comprises: for each LEO satellite, obtaining the first range of areas by performing combination traversing on each GEO satellite having frequency interference with the LEO satellite and a beam service area of the LEO satellite, wherein the beam service area comprises the service areas of the movable spot beams of the transmitting and receiving user antennas of the LEO satellite.

4. The method of claim 3, wherein, a GEO satellite on an orbit with a certain inclination angle at any longitude location above the equator interferes with the LEO satellite, and performing the combination traversing on each GEO satellite having the frequency interference with the LEO satellite and the beam service area of the LEO satellite comprises:

for an LEO satellite on a certain circular orbit, the areas in which the spatial isolation angle between the LEO satellite and each GEO satellite does not satisfy the minimum spatial isolation angle are not related to a longitude of the LEO satellite, but related to a latitude, an orbit altitude and a beam coverage area of the LEO satellite, and after determining the orbit altitude and the beam coverage area of the LEO satellite, the areas in which the spatial isolation angle does not satisfy the minimum spatial isolation angle are only related to the latitude of the LEO satellite, but not related to the longitude of the LEO satellite.

5. The method of claim 1, wherein in addition to the movable spot beams of the transmitting user antenna and the receiving user antenna, each LEO satellite is provided with a transmitting signaling antenna for providing a downlink signaling beam service for the users and a receiving signaling antenna for providing an uplink signaling beam service for the users, the transmitting signaling antenna and the receiving signaling antenna each has a signaling beam consisted of a plurality of signaling sub-beams, each signaling sub-beam is assigned with a different sub-frequency as needed, these signaling sub-beams further form a series of beam positions by means of time division service, the series of beam positions can realize spliced coverage of a sub-satellite service area of the LEO satellite, and sub-frequency isolation is carried out for different beam positions.

6. The method of claim 5, wherein, further comprising:
determining a second range of areas in which the spatial isolation angle between the LEO satellite and the GEO satellite does not satisfy the minimum spatial isolation angle within a service area of the signaling beam of the LEO satellite; and
turning off signaling sub-beams corresponding to the second range of areas in time, to reduce frequency interference between the signaling beam of the LEO satellite and the GEO satellite.

7. The method of claim 5, wherein the transmitting signaling antenna and the receiving signaling antenna adopt a fine beam position division, to precisely determine a second range of areas in which the signaling sub-beams are to be turned off to reduce frequency interference with the GEO satellite within an entire sub-satellite coverage area corresponding to the signaling beam of the LEO satellite, and to achieve more than one coverage of the ground globally or within a certain latitude range by splicing available beam positions in the signaling beams of adjacent LEO satellites.

8. The method of claim 5, wherein the signaling beam of the LEO satellite adopts a frequency spreading mechanism, and the signaling beams of different LEO satellites are assigned with different frequency spreading codes to reduce frequency interference when the signaling beams of the different LEO satellites form multi-coverage.

9. The method of claim 1, wherein configuring the communication satellite system comprises:
configuring constellation parameters of the communication satellite system, the constellation parameters comprising an LEO satellite orbital altitude, an LEO satellite orbital inclination angle, a beam range of the transmitting and receiving user antennas, a beam range of the transmitting and receiving signaling antennas, a number of constellation orbital planes, and a number of satellites in a constellation orbital plane, wherein based on a multi-coverage characteristic of a constellation, when a sub-beam of a certain LEO satellite cannot provide services due to frequency interference with the GEO satellite, a sub-beam of an adjacent LEO satellite that does not have frequency interference with the GEO satellite provides services, and the communication satellite system has an ability to provide continuous and uninterrupted services to the users in any region globally or within a certain latitude range.

10. The method of claim 9, wherein the beam range of each of the transmitting and receiving user antennas and the transmitting and receiving signaling antennas is selected according to a minimum acceptable beam communication elevation angle.

11. A communication satellite system, comprising a plurality of LEO satellites each provided with a transmitting user antenna for providing a downlink business beam service for users and a receiving user antenna for providing an uplink business beam service for the users, wherein the transmitting user antenna and the receiving user antenna each comprises a plurality of movable spot beams, each movable spot beam is configured as a sub-beam assigned with a different sub-frequency as needed, and the movable spot beam is configured to realize a sub-satellite user gazing or tracking function of the LEO satellite by dynamically adjusting a service area, wherein the communication satellite system is configured to:
determine, based on a current location of each LEO satellite, a first range of areas in which a spatial isolation angle between the LEO satellite and the GEO satellite does not satisfy a minimum spatial isolation angle within service areas of the movable spot beams of the transmitting and receiving user antennas, the movable spot beams of the transmitting and receiving user antennas are enabled to not enter the areas in which the minimum spatial isolation angle is not satisfied, to reduce frequency interference between the movable spot beams of the transmitting and receiving user antennas of the LEO satellite and the GEO satellite; and
when the movable spot beams of the transmitting and receiving user antennas of a plurality of adjacent LEO satellites provide services to a same area, calculate a spatial isolation angle between the movable spot beams of the transmitting user antennas of any two adjacent LEO satellites and a spatial isolation angle between the movable spot beams of the receiving user antennas of the any two adjacent LEO satellites, and in response to the spatial isolation angle not satisfying the minimum spatial isolation angle, assign different sub-frequencies to the movable spot beams that do not satisfy the minimum spatial isolation angle, to reduce frequency interference within the communication satellite system.

12. The system of claim 11, wherein the spatial isolation angle is an angle between two lines respectively connecting two satellites with a same sub-satellite location of an LEO satellite when both the two satellites provide services to the same sub-satellite location, wherein the two satellites include one LEO satellite and one GEO satellite or include two adjacent LEO satellites in a constellation, and in response to the spatial isolation angle being greater than a preset angle, it is determined that frequency interference between the two satellites can be reduced to an acceptable degree.

13. The system of claim 11, wherein the communication satellite system is configured to: the current LEO satellite and the GEO satellite does not satisfy the minimum spatial isolation angle within a service area of the current LEO satellite, it is required to
for each LEO satellite, obtain the first range of areas by performing combination traversing on each GEO satellite having frequency interference with the LEO satellite and a beam service area of the LEO satellite, wherein the beam service area comprises the service areas of the movable spot beams of the transmitting and receiving user antennas of the LEO satellite.

14. The system of claim 13, wherein a GEO satellite on an orbit with a certain inclination angle at any longitude location above the equator interferes with the LEO satellite, and performing the combination traversing on each GEO satellite having the frequency interference with the LEO satellite and the beam service area of the LEO satellite comprises:
assuming that a GEO satellite on an orbit with a certain inclination angle at any longitude location above the equator interferes with the LEO satellite, for an LEO satellite on a certain circular orbit, the areas in which the spatial isolation angle between the LEO satellite and the GEO satellite does not satisfy the minimum spatial isolation angle are not related to a longitude of the LEO satellite, but related to a latitude, an orbit altitude and a beam coverage area of the LEO satellite, and after determining the orbit altitude and the beam coverage area of the LEO satellite, the areas in which the spatial isolation angle does not satisfy the minimum spatial isolation angle are only related to the latitude of the LEO satellite, but not related to the longitude of the LEO satellite.

15. The system of claim 11, wherein in addition to the movable spot beams of the transmitting user antenna and the receiving user antenna, each LEO satellite is provided with a transmitting signaling antenna for providing a downlink signaling beam service for the users and a receiving signaling antenna for providing an uplink signaling beam service for the users, the transmitting signaling antenna and the receiving signaling antenna each has a signaling beam consisted of a plurality of signaling sub-beams, each signaling sub-beam is assigned with a different sub-frequency as needed, these signaling sub-beams further form a series of beam positions by means of time division service, the series of beam positions can cover realize spliced coverage of a sub-satellite service area of the LEO satellite, and sub-frequency isolation is carried out for different beam positions.

16. The system of claim 15, wherein, the communication satellite system is further configured to:
  determine a second range of areas in which the spatial isolation angle between the LEO satellite and the GEO satellite does not satisfy the minimum spatial isolation angle within a service area of the signaling beam of the LEO satellite; and
  turn off signaling sub-beams corresponding to the second range of areas in time, to reduce frequency interference between the signaling beam of the LEO satellite and the GEO satellite.

17. The system of claim 15, wherein the transmitting signaling antenna and the receiving signaling antenna adopt a fine beam position division, to precisely determine a second range of areas in which the signaling sub-beams are to be turned off to reduce frequency interference with the GEO satellite within an entire sub-satellite coverage area corresponding to the signaling beam of the LEO satellite, and to achieve more than one coverage of the ground globally or within a certain latitude range by splicing available beam positions in the signaling beams of adjacent LEO satellites; or
  wherein the signaling beam of the LEO satellite adopts a frequency spreading mechanism, and the signaling beams of different LEO satellites are assigned with different frequency spreading codes to reduce frequency interference when the signaling beams of the different LEO satellites form multi-coverage.

18. The system of claim 11, wherein after adding LEO satellites to the communication satellite system to expand the communication satellite system, the communication satellite system is expanded into a low-orbit communication satellite system with a same orbital inclination angle and altitude or a multi-layer low-orbit communication satellite system with different orbital inclination angles and altitudes, the expanded communication satellite system can still achieve an effect of reducing the frequency interference between the LEO satellite and the GEO satellite, while continuing to achieve an effect of reducing the frequency interference between the LEO satellites in the expanded communication satellite system.

19. The system of claim 11, wherein the transmitting and receiving user antennas adopt a phased array technology, and the movable spot beams of the transmitting and receiving user antennas provide services to the users by time-division beam hopping; or
  wherein the transmitting and receiving signaling antennas adopt a phased array technology, and the sub-beams of the transmitting and receiving signaling antennas form a plurality of beam positions by time division.

20. The system of claim 11, wherein an inter-satellite link antenna and an earth-satellite feeding antenna are configured for the LEO satellites in the communication satellite system.

* * * * *